United States Patent
Baek et al.

(10) Patent No.: US 9,460,259 B2
(45) Date of Patent: Oct. 4, 2016

(54) METHODS OF GENERATING INTEGRATED CIRCUIT LAYOUT USING STANDARD CELL LIBRARY

(71) Applicant: Samsung Electronics Co., Ltd., Suwon-si, Gyeonggi-do (KR)

(72) Inventors: Sang-hoon Baek, Seoul (KR); Jae-woo Seo, Seoul (KR); Gi-young Yang, Seoul (KR); Dal-hee Lee, Seoul (KR); Sung-wee Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/832,325

(22) Filed: Aug. 21, 2015

(65) Prior Publication Data

US 2016/0055285 A1    Feb. 25, 2016

Related U.S. Application Data

(60) Provisional application No. 62/040,479, filed on Aug. 22, 2014.

(30) Foreign Application Priority Data

Feb. 6, 2015   (KR) .......................... 10-2015-0018867

(51) Int. Cl.
*G06F 17/50*   (2006.01)
*H01L 21/8234*   (2006.01)
*H01L 21/8238*   (2006.01)

(52) U.S. Cl.
CPC ........... *G06F 17/5072* (2013.01); *G06F 17/50* (2013.01); *G06F 17/5068* (2013.01);
(Continued)

(58) Field of Classification Search
CPC ........... G06F 17/5068; G06F 17/5081; G06F 17/50; G06F 2217/06; G06F 2217/78; G06F 2217/12; H01L 21/823431; H01L 21/823821; H01L 21/845
See application file for complete search history.

(56) References Cited

U.S. PATENT DOCUMENTS

| 7,800,140 B2 | 9/2010 | Nakanishi et al. |
| 8,357,955 B2 | 1/2013 | Tanaka |

(Continued)

FOREIGN PATENT DOCUMENTS

| JP | 2008-235350 A | 10/2008 |
| JP | 2008311361 A | 12/2008 |

(Continued)

OTHER PUBLICATIONS

Office Action for corresponding Korean Application No. 10-2015-0018867 dated Jan. 4, 2016.

*Primary Examiner* — Helen Rossoshek
(74) *Attorney, Agent, or Firm* — Harness, Dickey & Pierce, P.L.C.

(57) ABSTRACT

Methods of generating an integrated circuit layout include forming a standard cell by providing a first active area adjacent to a first cell boundary line. The first active area is spaced apart from the first cell boundary line by a first distance. A second active area is provided adjacent to a second cell boundary line. The second cell boundary line opposes the first cell boundary line. The second active area is spaced apart from the second cell boundary line by a second distance. Fins are formed on the first and second active areas. The fins extend in a first direction and parallel to one another in a second direction substantially perpendicular to the first direction. The first cell boundary line is parallel to the fins. The first distance and the second distance remain constant when a number of the fins on the first and second active areas is changed.

11 Claims, 21 Drawing Sheets

(52) U.S. Cl.
CPC ....... *G06F17/5081* (2013.01); *G06F 2217/06* (2013.01); *G06F 2217/12* (2013.01); *G06F 2217/78* (2013.01); *H01L 21/823431* (2013.01); *H01L 21/823821* (2013.01)

(56) References Cited

U.S. PATENT DOCUMENTS

| | | | |
|---|---|---|---|
| 8,728,892 B2 | 5/2014 | Ou et al. | |
| 8,739,104 B1 | 5/2014 | Penzes et al. | |
| 8,813,014 B2 * | 8/2014 | Yu | H01L 27/0207 257/206 |
| 8,869,089 B2 * | 10/2014 | Baek | G06F 17/5081 716/122 |
| 8,975,712 B2 * | 3/2015 | Rashed | G06F 17/5072 257/287 |
| 9,026,975 B2 * | 5/2015 | Song | G06F 17/5081 703/14 |
| 9,026,977 B2 * | 5/2015 | Tarabbia | G06F 17/5077 327/565 |
| 9,098,670 B2 * | 8/2015 | Song | G06F 17/5072 |
| 9,105,467 B2 * | 8/2015 | Lee | H01L 29/6681 |
| 9,158,877 B2 * | 10/2015 | Hsieh | G06F 17/5072 |
| 9,299,842 B2 | 3/2016 | Baek | |
| 2008/0309374 A1 | 12/2008 | Kobayashi | |
| 2010/0127333 A1 | 5/2010 | Hou et al. | |
| 2010/0213548 A1 * | 8/2010 | Chang | H01L 21/823878 257/348 |
| 2010/0308327 A1 | 12/2010 | Nakahara et al. | |
| 2012/0286331 A1 | 11/2012 | Aton et al. | |
| 2013/0084655 A1 | 4/2013 | Yue et al. | |
| 2013/0263077 A1 * | 10/2013 | Baek | G06F 17/5068 716/122 |
| 2014/0001564 A1 | 1/2014 | Song et al. | |
| 2014/0054722 A1 | 2/2014 | Kawa et al. | |
| 2014/0097493 A1 * | 4/2014 | Baek | H01L 27/1211 257/347 |
| 2014/0217514 A1 | 8/2014 | Moroz et al. | |
| 2014/0339647 A1 * | 11/2014 | Rashed | G06F 17/5072 257/401 |
| 2015/0014775 A1 * | 1/2015 | Seo | H01L 23/5286 257/351 |
| 2015/0161314 A1 * | 6/2015 | Kim | G06F 17/5072 716/102 |
| 2015/0205901 A1 * | 7/2015 | Kim | G06F 17/5072 716/55 |

FOREIGN PATENT DOCUMENTS

| | | |
|---|---|---|
| JP | 2011-238713 A | 11/2011 |
| JP | 5552775 B2 | 6/2014 |
| KR | 10-1087864 B1 | 11/2011 |
| KR | 10-2013-0110961 A | 10/2013 |
| KR | 10-2014-0001578 A | 1/2014 |
| KR | 20140036446 A | 3/2014 |
| KR | 10-2014-0046655 A | 4/2014 |

* cited by examiner

METHODS OF GENERATING INTEGRATED CIRCUIT LAYOUT USING STANDARD CELL LIBRARY

CROSS-REFERENCE TO RELATED APPLICATIONS

This application claims the benefit of priority under 35 U.S.C. §119 from U.S. Provisional Application No. 62/040,479, filed on Aug. 22, 2014, in the US Patent Office and Korean Patent Application No. 10-2015-0018867, filed on Feb. 6, 2015, in the Korean Intellectual Property Office, the contents of each of which are incorporated herein by reference in their entirety.

BACKGROUND

1. Field

Some example embodiments of the inventive concepts relate to an integrated circuit (IC), and/or more particularly, to an IC including at least one standard cell and/or a standard cell library storing information about the least one standard cell. Some example embodiments relate to methods of generating a layout of an integrated circuit (IC), and/or to methods of generating a layout of an IC including at least one standard cell, and/or to methods of generating a layout of an IC using a standard cell library storing information about the least one standard cell.

2. Related Art

As a size of a transistor is reduced due to the development of semiconductor processing technologies, more transistors are integrated in a semiconductor device. A system-on-chip (SOC) refers to an IC in which all components of a computer or other electronic system are integrated into a single chip. The SOC has been widely used in various applications. As the performance of applications is improved, there is a need for a semiconductor device to include more components.

SUMMARY

Some example embodiments of the inventive concepts relate to an integrated circuit (IC), and/or more particularly, to an IC including at least one standard cell and/or a standard cell library storing information about the least one standard cell. Some example embodiments relate to methods of generating a layout of an integrated circuit (IC), and/or to methods of generating a layout of an IC including at least one standard cell, and/or to methods of generating a layout of an IC using a standard cell library storing information about the least one standard cell.

According to some example embodiments of the inventive concepts, there is provided an integrated circuit (IC) including at least one standard cell including a plurality of fins extending in a first direction and parallel to one another in a second direction substantially perpendicular to the first direction; a first active area adjacent to a first cell boundary line, the first cell boundary line being parallel to the plurality of fins, and the first active area being spaced apart from the first cell boundary line by a first distance; and a second active area adjacent to a second cell boundary line, the second cell boundary line opposing the first cell boundary line, and the second active area being spaced apart from the second cell boundary line by a second distance, the first distance and the second distance remaining constant.

A space between the first active area and the second active area may decrease as lengths of the first and second active areas in the second direction are increased.

Lengths of the first and second active areas in the second direction may be changed, and the first and second distances remain constant.

The first distance may be substantially equal to the second distance.

The plurality of fins may include active fins on the first and second active areas; and dummy fins on dummy areas, the first and second active areas not being in the dummy areas.

The dummy fins may include at least one first dummy fin between the first cell boundary line and the first active area, at least one second dummy fin between the second cell boundary line and the second active area, and at least one third dummy fin between the first active area and second active area.

A number of the at least one first dummy fin may be equal to a number of the at least one second dummy fin.

A number of the active fins may increase as a number of the at least one third dummy fin decreases.

A number of the at least one first dummy fin and a number of the at least one second dummy fin may remain constant when a number of the active fins is changed.

The at least one standard cell may further include a plurality of conductive lines extending in the second direction, and the conductive lines may be parallel to one another in the first direction.

A conductivity type of the first active area may be different from a conductivity type of the second active area.

According to some example embodiments of the inventive concepts, there is provided an IC including at least one standard cell including a plurality of active fins extending in a first direction and parallel to one another in a second direction substantially perpendicular to the first direction; and a plurality of dummy fins parallel to the plurality of active fins, wherein a first active fin of the plurality of active fins being closest to a first cell boundary line, the first active fin being spaced apart from the first cell boundary line by a first distance, a second active fin of the plurality of active fins being closest to a second cell boundary line, the second active fin being spaced apart from the second cell boundary line by a second distance, and the first distance and the second distance remaining constant.

The dummy fins may include at least one first dummy fin between the first cell boundary line and the first active fin; and at least one second dummy fin between the second cell boundary line and the second active fin.

A number of the at least one first dummy fin may be equal to a number of the at least one second dummy fin.

When a number of the active fins is changed, a number of the at least one first dummy fin and a number of the at least one second dummy fin remain constant.

According to some example embodiments of the inventive concepts, there is provided a standard cell library including information about a plurality of standard cells and stored in a non-transitory computer-readable storage medium, at least one of the plurality of standard cells including a plurality of fins extending in a first direction and disposed parallel to one another in a second direction substantially perpendicular to the first direction; a first active area disposed adjacent to a first cell boundary parallel to the plurality of fins, the first active area being spaced apart from the first cell boundary by a first distance; and a second active area disposed adjacent to a second cell boundary facing the first cell boundary, the second active area being spaced apart from the second cell boundary by a second distance, wherein the first distance and the second distance remain constant when a number of the fins on the first and second active areas is changed.

As lengths of the first and second active areas in the second direction increase, a space between the first active area and the second active area may decrease, and even when the lengths of the first and second active areas in the second direction are changed, the first and second distances may be not changed.

The first distance may be substantially equal to the second distance.

The plurality of fins may include active fins on the first and second active areas, and dummy fins on dummy areas in which the first and second active areas are not disposed, wherein, when the number of the active fins is changed, the number of dummy fins disposed between the first active area and the second active area from among the dummy fins may be changed.

The at least one standard cell may further include a plurality of conductive lines extending in the second direction and disposed in parallel to one another in the first direction.

According to some example embodiments, a method of generating a layout of an integrated circuit (IC) includes forming at least one standard cell. The forming at least one standard cell includes providing a first active area disposed adjacent to a first cell boundary line, and the first active area being spaced apart from the first cell boundary line by a first distance, providing a second active area disposed adjacent to a second cell boundary line, the second cell boundary line opposing the first cell boundary line, and the second active area being spaced apart from the second cell boundary line by a second distance; and forming fins on the first and second active areas, the fins extending in a first direction and parallel to one another in a second direction substantially perpendicular to the first direction. The first cell boundary line is parallel to the fins. The first distance and the second distance remain constant when a number of the fins on the first and second active areas is changed.

The method may further include decreasing a space between the first active area and the second active area when lengths of the first and second active areas in the second direction are increased.

The method may further include adjusting lengths of the first and second active areas in the second direction while the first and second distances remain constant.

The first distance may be substantially equal to the second distance.

The forming fins may include forming active fins on the first and second active areas; and forming dummy fins on dummy areas, the first and second active areas not being disposed in the dummy areas.

The forming dummy fins may include forming at least one first dummy fin disposed between the first cell boundary line and the first active area; forming at least one second dummy fin disposed between the second cell boundary line and the second active area; and at least one third dummy fin disposed between the first active area and second active area.

A number of the at least one first dummy fin may be equal to a number of the at least one second dummy fin.

The method may further include reducing a number of the at least one third dummy fin when a number of the active fins is increased.

The method may further include adjusting a number of the active fins while a number of the at least one first dummy fin and a number of the at least one second dummy fin remain constant.

The forming at least one standard cell may further include forming conductive lines extending in the second direction, the conductive lines being parallel to one another in the first direction.

A conductivity type of the first active area may be different from a conductivity type of the second active area.

According to example embodiments, a method of generating a layout of an integrated circuit (IC) includes forming at least one standard cell. The forming at least one standard cell includes forming active fins extending in a first direction and parallel to one another in a second direction substantially perpendicular to the first direction; and forming dummy fins parallel to the active fins. The forming active fins includes forming a first active fin closest to a first cell boundary line, the first active fin being spaced apart from the first cell boundary line by a first distance, and forming a second active fin closest to a second cell boundary line. The second active fin may be spaced apart from the second cell boundary line by a second distance. The first distance and the second distance remain constant when a number of the active fins is changed.

The forming dummy fins may include forming at least one first dummy fin disposed between the first cell boundary line and the first active fin; and forming at least one second dummy fin disposed between the second cell boundary line and the second active fin.

A number of the at least one first dummy fin may be equal to a number of the at least one second dummy fin.

The method may further include adjusting the number of the active fins while a number of the at least one first dummy fin and a number of the at least one second dummy fin remain constant.

According to example embodiments, a method of generating an integrated circuit (IC) layout using a standard cell library includes providing at least one functional definition of the IC layout; selecting standard cells from a standard cell library stored on a non-transitory computer-readable storage medium, the standard cells satisfying the at least one functional definition; and generating the IC layout using the selected standard cells. The standard cells include fins extending in a first direction and parallel to one another in a second direction substantially perpendicular to the first the first direction, a first active area adjacent to a first cell boundary line, the first cell boundary being parallel to the fins, and the first active area being spaced apart from the first cell boundary line by a first distance, and a second active area adjacent to a second cell boundary line, the second cell boundary line opposing the first cell boundary line, and the second active area being spaced apart from the second cell boundary line by a second distance. The first distance and the second distance remain constant when a number of the fins on the first and second active areas is changed.

The generating the IC layout may include decreasing a space between the first active area and the second active area when lengths of the first and second active areas in the second direction are increased.

The generating the IC layout may include changing lengths of the first and second active areas in the second direction while the first and second distances remain constant.

The fins may include active fins disposed on the first and second active areas, and dummy fins disposed on dummy areas, the first and second active areas not being disposed on the dummy areas.

The generating the IC layout may include changing a number of the dummy fins disposed between the first active area and the second active area when a number of the active fins is changed.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1A:
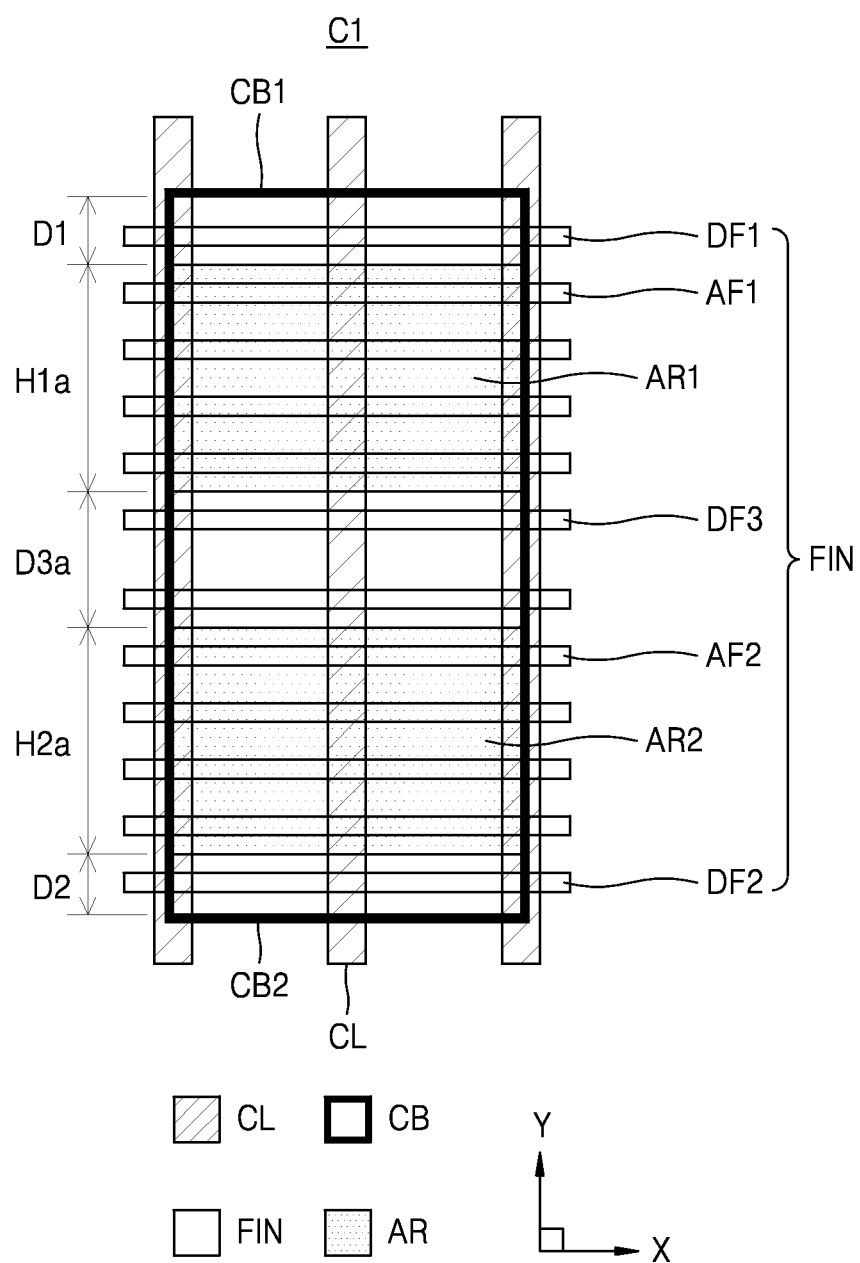
FIGS. 1A to 1C are layouts of standard cells according to some example embodiments of the inventive concepts.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An integrated circuit (IC) may be defined as a plurality of cells and may be designed by using a cell library including characteristic information of the plurality of cells. In the cell library, names, dimensions, gate widths, pins, delay characteristics, leakage currents, threshold voltages, and/or functions of cells may be defined. A general cell library set may include a basic cell such as AND, OR, NOR, and inverter, a complex cell such as OAI (OR/AND/INVERTER) and AOI (AND/OR/INVERTER), and a storage element such as a simple master-slave flip-flop and a latch.

In some example embodiments of inventive concepts which will be described below, the cell library may be a standard cell library. In a method using a standard cell library, logic circuit blocks (or cells) with multiple functions (or functional definitions) are prepared in advance and are arbitrarily combined to design a large-scale integrated circuit (LSI) satisfying a customer or user's specifications. The cells are designed and verified in advance and are registered in a computer. The cells are subjected to logic design, placement, and routing through a combination of the cells by using a computer-aided design (CAD).

Specifically, in designing or manufacturing an LSI, if the standard logic circuit blocks (or cells) are prestored in a library, appropriate logic circuit blocks for the purpose of the design may be chosen from the library and be disposed on a chip in a plurality of cell rows, and an optimal routing with a shortest routing length may be laid out in a routing space between cells, thereby completing the manufacturing of the LSI. As more various types of cells are in the library, the designing may become more flexible and the probability of optimal chip design may increase as much.

Such an IC using a standard cell is a kind of semi-order-made IC, which may be manufactured by selection of previously created standard cells stored in a library and placement and minimal routing of the standard cells. Thus, development costs and development periods may be reduced as compared with full-custom-made ICs.

In order to more specifically describe example embodiments, various features will be described in detail with reference to the attached drawings. However, example embodiments described are not limited thereto.

Figure 1B:
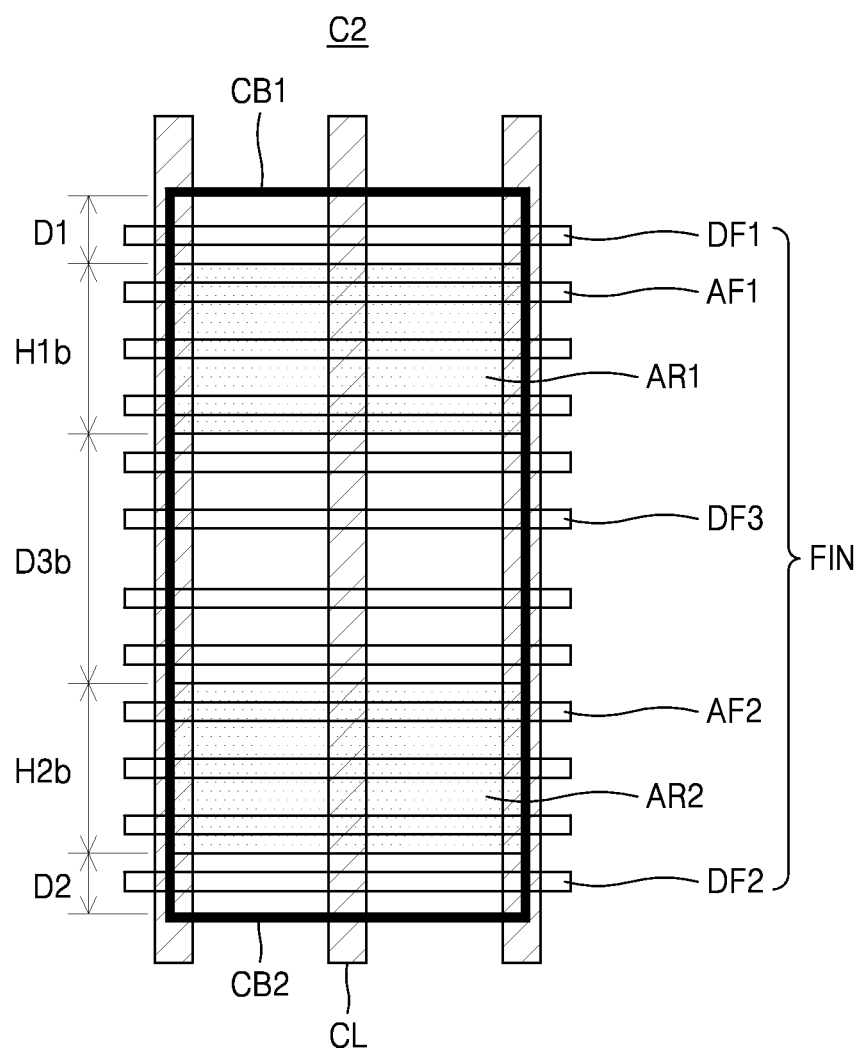
Figure 1C:
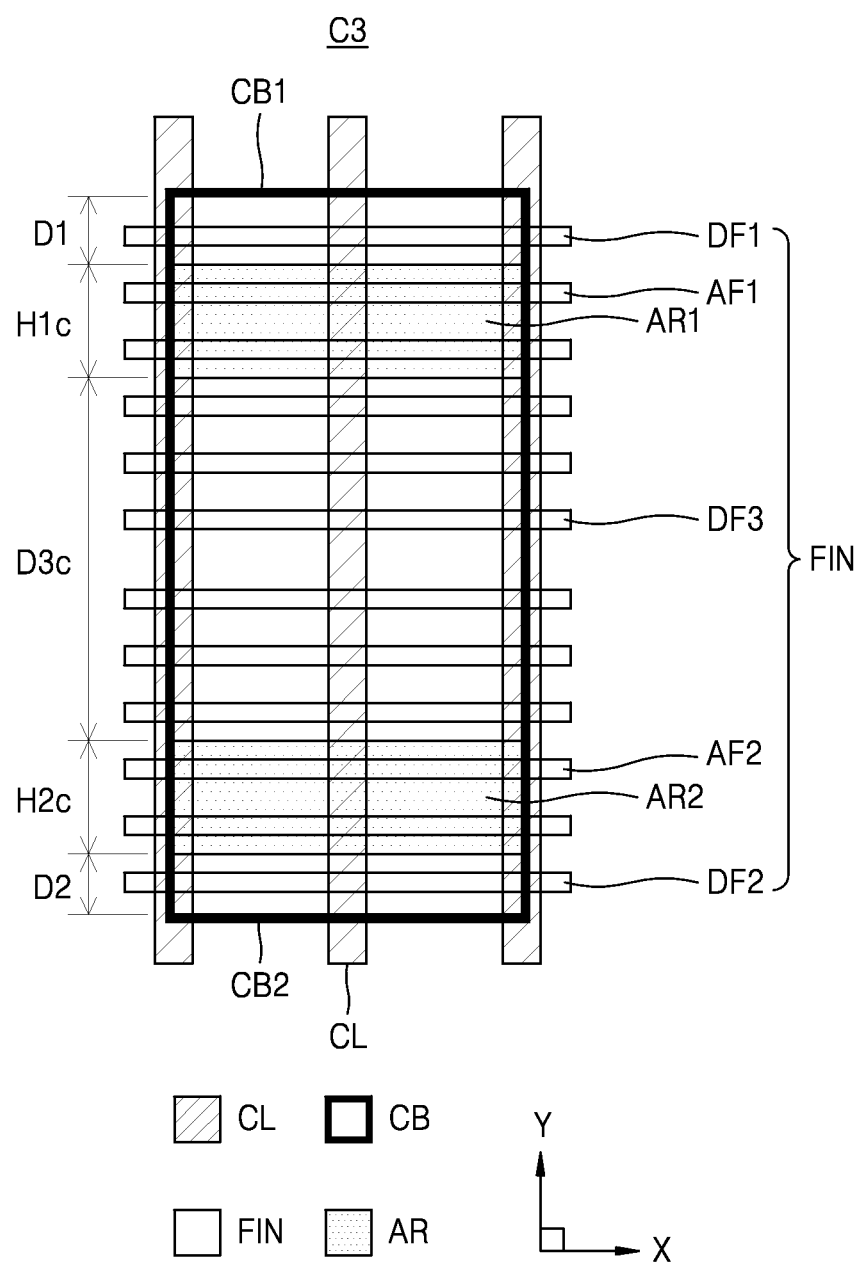

Some example embodiments of the inventive concepts relate to an integrated circuit (IC), and/or more particularly, to an IC including at least one standard cell and/or a standard cell library storing information about the least one standard cell. Some example embodiments relate to methods of generating a layout of an integrated circuit (IC), and/or to methods of generating a layout of an IC including at least one standard cell, and/or to methods of generating a layout of an IC using a standard cell library storing information about the least one standard cell. FIGS. 1A to 1C are layouts of standard cells according to some example embodiments of the inventive concepts.

Referring to FIG. 1A, a standard cell C1 may be defined by a cell boundary CB and may include a plurality of fins FIN and first and second active areas AR1 and AR2. Also, the standard cell C1 may further include a plurality of conductive lines CL. Although not illustrated, the standard cell C1 may further include contacts connected to the first and second active areas and contacts connected to the plurality of conductive lines CL.

A cell boundary CB is an outline defining the standard cell C1. A place and route tool may recognize the standard cell C1 by using the cell boundary CB. The cell boundary CB may include four cell boundary lines. Hereinafter, of the four cell boundaries, two cell boundaries, which are parallel to the plurality of fins FIN, are referred to as a first cell boundary line CB1 and a second cell boundary line CB2.

The plurality of fins FIN may extend in a first direction (for example, X direction) and may be disposed parallel to one another in a second direction (for example, Y direction) perpendicular to the first direction. The plurality of fins FIN may include first and second active fins AF1 and AF2, at least one first dummy fin DF1, at least one second dummy fin DF2, and at least one third dummy fin DF3.

The first active fins AF1 may be disposed in the first active area AR1 and the second active fins AF2 may be disposed in the second active area AR2. The at least one first dummy fin DF1 may be disposed between the first cell boundary line CB1 and the first active area AR1, the at least one second dummy fin DF2 may be disposed between the second active area AR2 and the second cell boundary line CB2, and the at least one third dummy fin DF3 may be disposed between the first active area AR1 and the second active area AR2. In the standard cell C1, an area in which the first and second active areas AR1 and AR2 are not disposed may be referred to as a dummy area or a field area.

In some example embodiments, the standard cell C1 may include four first active fins AF1, four second active fins AF2, one first dummy fin DF1, one second dummy fin DF2, and two third dummy fins DF3. However, example embodiments of the inventive concepts are not limited thereto, and the number of first and second active fins AF1 and AF2 and the number of the first to third dummy fins DF1, DF2, and DF3 may be variously changed. In some example embodiments, the standard cell C1 may not include any one of the first to third dummy fins DF1, DF2, and DF3.

A size of the first active area AR1 in the second direction (hereinafter referred to as a height), that is, a first height H1$a$ may be changed depending on the number of first active fins AF1. Similarly, a height of the second active area AR2, that is, a second height may be changed depending on the number of the second active fins AF2. In some example embodiments, the number of the first active fins AF1 may be equal to the number of the second active fins AF2, and therefore, the first height H1$a$ may be substantially equal to the second height H2$a$. In some example embodiments, a conductivity type of the first active area AR1 may be different from that of the second active area AR2.

In some example embodiments, the first and second active areas AR1 and AR2 may be disposed adjacent to the cell boundary CB. Specifically, the first active area AR1 may be disposed adjacent to the first cell boundary line CB1, and the second active area AR2 may be disposed adjacent to the second cell boundary line CB2. More specifically, the first active area AR1 may be spaced apart from the first cell boundary line CB1 by a first distance D1, and the second active area AR2 may be spaced apart from the second cell boundary line CB2 by a second distance D2.

In some example embodiments, the first and second distances D1 and D2 may have a constant value regardless of the number of the first active fins AF1 and the number of the second active fins AF2. In other words, the first and second distances D1 and D2 may have a constant value regardless of the first and second heights H1$a$ and H2$a$ of the first and second active areas AR1 and AR2. Therefore, the third distance D3$a$ between the first active area AR1 and the second active area AR2 may be variable depending on the number of the first active fins AF1 and the number of the second active fins AF2, that is, the first and second heights H1$a$ and H2$a$ of the first and second active areas AR1 and AR2.

As described above, according to some example embodiments, the first active area AR1 is disposed based on the first distance D1 from the first cell boundary line CB1, not based on the third distance D3$a$ between the first active area AR1 and the second active area AR2. Similarly, the second active area AR2 is disposed based on the second distance D2 from the second cell boundary line CB2, not based on the third distance D3$a$ between the first active area AR1 and the second active area AR2.

The plurality of conductive lines CL may extend in the second direction (for example, the Y direction) and may be disposed parallel to one another in the first direction (for example, the X direction). The conductive lines CL may be made of any material having electrical conductivity and may include, for example, polysilicon, a metal, a metal alloy, or the like.

In some example embodiments, the conductive lines CL may correspond to gate electrodes. However, example embodiments are not limited thereto, and the conductive lines CL may be traces having arbitrary conductivity, or the like. Also, although the standard cell C1 is illustrated in FIG. 1A as including the three conductive lines, example embodiments are not limited thereto. The standard cell C1 may extend in the second direction and include four or more conductive lines disposed parallel to one another in the first direction.

Referring to FIG. 1B, a standard cell C2 may be defined by a cell boundary CB, and include a plurality of fins FIN and first and second active areas AR1 and AR2. Also, the standard cell C2 may further include a plurality of conductive lines CL. The standard cell C2 according to the some example embodiments is a modification of the standard cell C1 of FIG. 1A and the content described with reference to FIG. 1A may be applied to like elements shown in FIG. 1B. The following description will focus on differences from the standard cell of FIG. 1A.

In some example embodiments, the standard cell C2 may include three first active fins AF1, three second active fins AF2, one first dummy fin DF1, one second dummy fin DF2, and four third dummy fins DF3. However, example embodiments are not limited thereto, and the number of each of the first and second active fins AF1 and AF2, and the number of each of the first to third dummy fins DF1, DF2, and DF3 may be changed variously. In some example embodiments, the standard cell C2 may not include one of the first to third dummy fins DF1, DF2, and DF3.

A height H1$b$ of the first active area AR1 may be changed depending on the number of the first active fins AF1. Similarly, a height H2$b$ of the second active area AR2 may be changed depending on the number of the second active fins AF2. In some example embodiments, the number of the first active fins AF1 may be equal to the number of the second active fins AF2, and therefore, the first height H1$b$ may be substantially equal to the second height H2$b$. In some example embodiments, a conductivity type of the first active area AR1 may be different from that of the second active area AR2.

In some example embodiments, the first and second active areas AR1 and AR2 may be disposed adjacent to the cell boundary CB. Specifically, the first active area AR1 may be disposed adjacent to the first cell boundary line CB1, and the second active area AR2 may be disposed adjacent to the second cell boundary line CB2. More specifically, the first active area AR1 may be spaced apart from the first cell boundary line CB1 by the first distance D1, and the second active area AR2 may be spaced apart from the second cell boundary line CB2 by the second distance D2.

In some example embodiments, the first and second distances D1 and D2 may have a constant value regardless of the number of the first and second active fins AF1 and AF2. In order words, the first and second distances D1 and D2 may have a constant value regardless of the first and second heights H1$b$ and H2$b$ of the first and second active areas AR1 and AR2. Therefore, a third distance D3$b$ between the first active area AR1 and the second active area AR2 is variable depending on the number of the first and second active fins AF1 and AF2, that is, the first and second heights H1$b$ and H2$b$ of the first and second active areas AR1 and AR2.

Therefore, according to some example embodiments, the number of the first active fins AF1 and the number of the second active fins AF2 are smaller than those in FIG. 1A. Thus, the first and second heights H1$b$, and H2$b$ of the first and second active areas AR1 and AR2 are also smaller than the first and second heights H1$a$ and H2$a$ in FIG. 1A. Nevertheless, the first and second distances D1 and D2 may be substantially equal to the first and second distances D1 and D2 in FIG. 1A. On the other hand, the third distance D3$b$ may be larger than the third distance D3$a$ of FIG. 1A.

As described above, according to some example embodiments, the first active area AR1 is disposed based on the first distance D1 from the first cell boundary line CB1, not based on the third distance D3$b$ between the first active area AR1 and the second active area AR2. Similarly, the second active area AR2 is disposed based on the second distance D2 from the second cell boundary line CB2, not based on the third distance D3b between the first active area AR1 and the second active area AR2.

Referring to FIG. 1C, a standard cell C3 may be defined by a cell boundary CB, and include a plurality of fins FIN and first and second active areas AR1 and AR2. Also, the standard cell C3 may further include a plurality of conductive lines CL. The standard cell C3 according to some example embodiments is a modification of the standard cell C1 of FIG. 1A and the standard cell C2 of FIG. 1B, and the contents described with reference to FIGS. 1A and 1B may be applied to like elements shown in FIG. 1C. The following description will focus on a difference from the standard cells of FIGS. 1A and 1B.

In some example embodiments, the standard cell C3 may include two first active fins AF1, two second active fins AF2, one first dummy fin DF1, one second dummy fin DF2, and six third dummy fins DF3. However, example embodiments are not limited thereto, and the number of each of the first and second active fins AF1 and AF2, and the number of each of the first to third dummy fins DF1, DF2, and DF3 may be changed variously. In some example embodiments, the standard cell C3 may not include one of the first to third dummy fins DF1, DF2, and DF3.

A height H1e of the first active area AR1 may be changed depending on the number of the first active fins AF1. Similarly, a height H2c of the second active area AR2 may be changed depending on the number of the second active fins AF2. In some example embodiments, the number of the first active fins AF1 may be equal to the number of the second active fins AF2, and therefore, the first height H1c may be substantially equal to the second height H2c. In some example embodiments, a conductivity type of the first active area AR1 may be different from that of the second active area AR2.

In some example embodiments, the first and second active areas AR1 and AR2 may be disposed adjacent to the cell boundary CB. Specifically, the first active area AR1 may be disposed adjacent to the first cell boundary line CB1, and the second active area AR2 may be disposed adjacent to the second cell boundary line CB2. More specifically, the first active area AR1 may be spaced apart from the first cell boundary line CB1 by the first distance D1, and the second active area AR2 may be spaced apart from the second cell boundary line CB2 by the second distance D2.

In some example embodiments, the first and second distances D1 and D2 may have a constant value regardless of the number of the first active fins AF1 and the number of the second fins AF2. In order words, the first and second distances D1 and D2 may have a constant value regardless of the first and second heights H1c and H2c of the first and second active areas AR1 and AR2. Therefore, a third distance D3c between the first active area AR1 and the second active area AR2 is variable depending on the number of the first active fins AF1 and the number of the second active fins AF2, that is, the first and second heights H1c and H2c of the first and second active areas AR1 and AR2.

Therefore, according to some example embodiments, the number of the first active fins AF1 and the number of second active fins AF2 are smaller than those in FIGS. 1A and 1B. Thus, the first and second heights H1c and H2c of the first and second active areas AR1 and AR2 are also smaller than the first and second heights H1a and H2a in FIG. 1A and the first and second heights H1c and H2c in FIG. 1B. Nevertheless, the first and second distances D1 and D2 may be substantially equal to the first and second distances D1 and D2 in FIGS. 1A and 1B. On the other hand, the third distance D3c may be larger than the third distance D3a of FIG. 1A and the third distance D3b of FIG. 1B.

As described above, according to some example embodiments, the first active area AR1 is disposed based on the first distance D1 from the first cell boundary line CB1, not based on the third distance D3c between the first active area AR1 and the second active area AR2. Similarly, the second active area AR2 is disposed based on the second distance D2 from the second cell boundary line CB2, not based on based on the third distance D3c between the first active area AR1 and the second active area AR2.

According to some example embodiments illustrated in FIGS. 1A to 1C, when the number of the first active fins AF1 and the number of the second active fins AF2 are changed, heights of the first and second active areas AR1 and AR2 may be changed. As described above, according to some example embodiments, the first and second active areas AR1 and AR2 may be spaced apart from the first and second boundary lines CB1 and CB2 by the first and second distances D1 and D2, based on the first and second cell boundary lines CB1 and CB2. In order words, according to some example embodiments, the first and second active areas AR1 and AR2 may be designed to be outbound toward the cell boundary CB.

FIGS. 2A to 2D are layouts of parts of ICs including the standard cells according to FIGS. 1A to 1C.

Figure 2A:
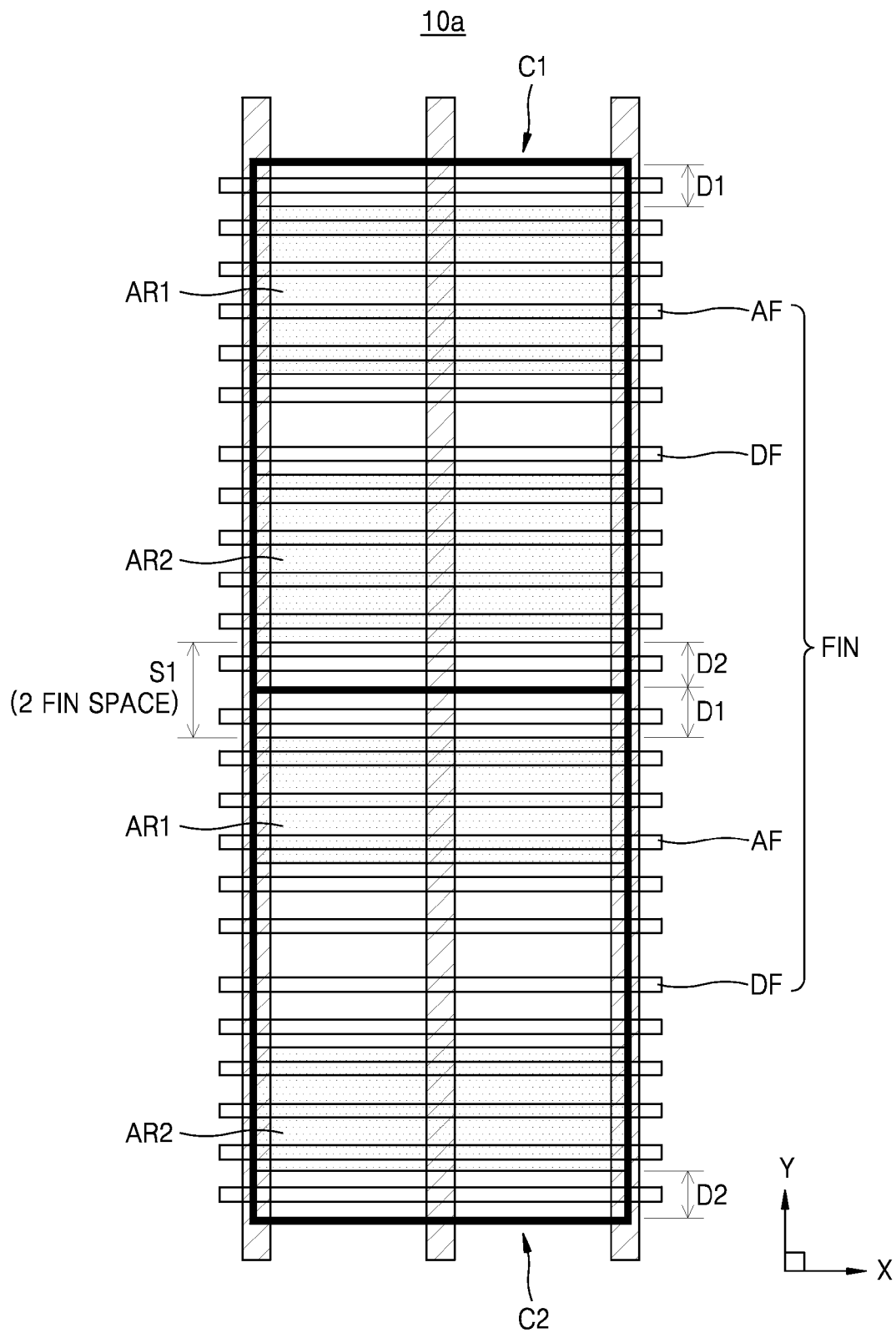
FIGS. 2A to 2D are layouts of parts of integrated circuits (ICs) including the standard cells illustrated in FIGS. 1A to 1C.

Referring to FIG. 2A, an IC 10a may include the first standard cell C1 and the second standard cell C2 disposed adjacent to each other in the second direction. The first standard cell C1 is disposed in an upper side of the IC 10a and the second standard cell C2 is disposed in a lower side of the IC 10a. In this case, the first standard cell C1 may correspond to the standard cell C1 of FIG. 1A, and the second standard cell C2 may correspond to the standard cell C2 of FIG. 1B. Hereinafter, a space between the second active area AR2 of the first standard cell C1 and the first active area AR1 of the second standard cell C2 is referred to as a first active-to-active space S1.

In some example embodiments, the first active-to-active space S1 of the IC 10a may be a fixed space. Specifically, the first active-to-active space S1 of the IC 10a may correspond to a sum of the second distance D2 of the first standard cell C1 and the first distance D1 of the second standard cell C2. In the example embodiments, in each standard cell, the first distance D1 may be substantially equal to the second distance D2, and the first and second distances D1 and D2 may be constant regardless of the heights of the first and second active areas AR1 and AR2. Therefore, the second distance D2 of the first standard cell C1 may be substantially equal to the first distance D1 of the second standard cell C2. In this case, the number of the second dummy fins DF2 of the first standard cell C1 is one and the number of the first dummy fins DF1 of the second standard cell C2 is one. Therefore, the number of the dummy fins disposed in the first active-to-active space S1 is two.

Figure 2B:
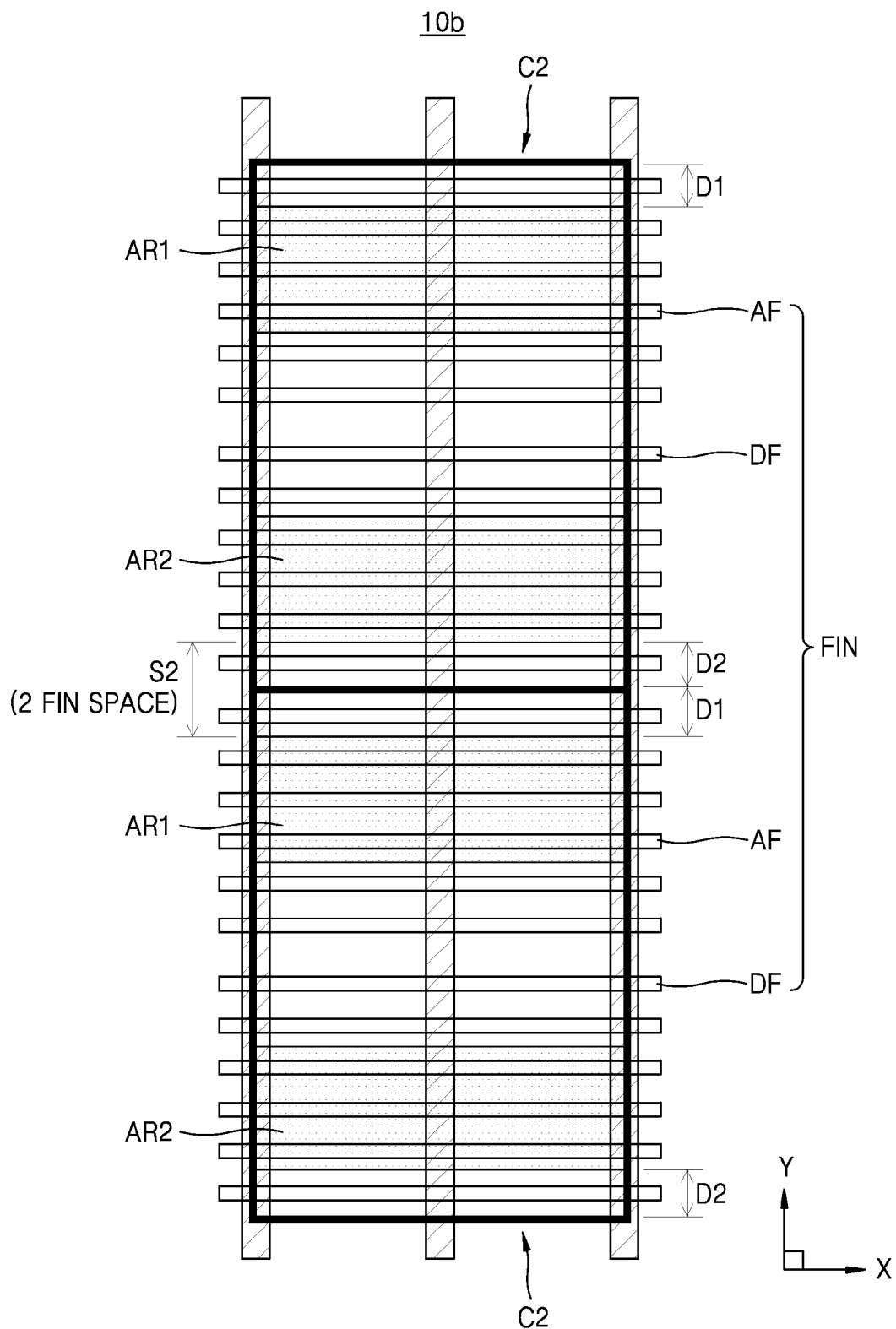

Referring to FIG. 2B, an IC 10b may include the second standard cell C2 and the second standard cell C2 disposed adjacent to each other in the second direction. In this case, the second standard cell C2 disposed on the upper side and the second standard cell C2 disposed on the lower side may correspond to the standard cell C2 of FIG. 1B. Hereinafter, a space between the second active area AR2 of the second standard cell C2 disposed on the upper side and the first active area AR1 of the second standard cell C2 disposed on the lower side is referred to as a second active-to-active space S2.

In some example embodiments, the second active-to-active space S2 of the IC 10b may be a fixed space. Specifically, the second active-to-active space S2 of the IC 10b may correspond to a sum of the second distance D2 of the second standard cell C2 and the first distance D1 of the second standard cell C2. In the example embodiments, the first distance D1 of the second standard cell C2 may be substantially equal to the second distance D2 of the second standard cell C2. In this case, the number of the second dummy fins DF2 of the second standard cell C2 is one and the number of the first dummy fins DF1 of the second standard cell C2 is one. Therefore, the number of the dummy fins disposed in the second active-to-active space S2 is two.

Figure 2C:
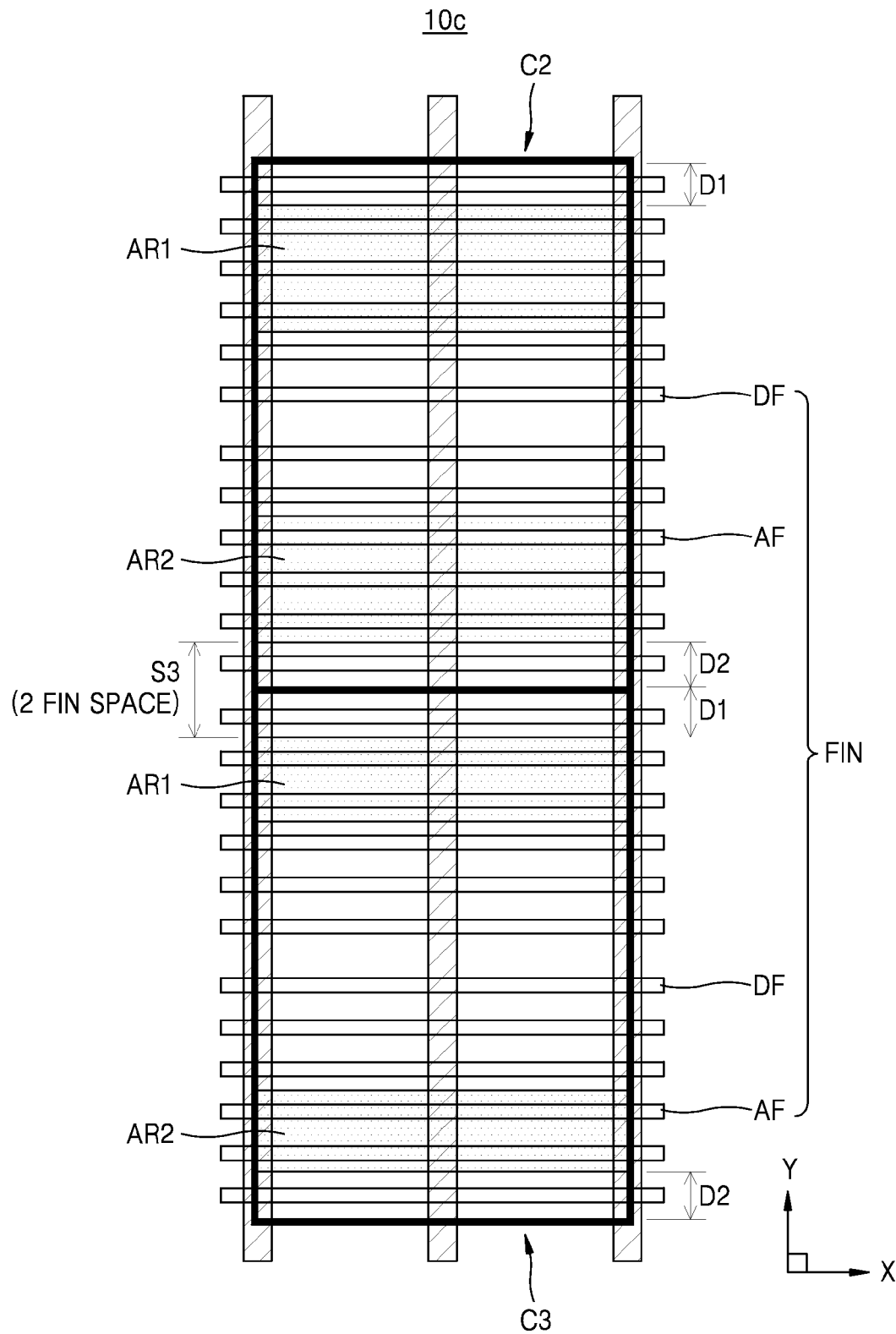

Referring to FIG. 2C, an IC 10c may include the second standard cell C2 and the third standard cell C3 disposed adjacent to each other in the second direction. In this case, the second standard cell C2 disposed on the upper side may correspond to the standard cell C2 of FIG. 1B, and the third standard cell C3 disposed on the lower side may correspond to the standard cell C3 of FIG. 1C. Hereinafter, a space between the second active area AR2 of the second standard cell C2 disposed on the upper side and the first active area AR1 of the third standard cell C3 disposed on the lower side is referred to as a third active-to-active space S3.

In some example embodiments, the third active-to-active space S3 of the IC 10c may be a fixed space. Specifically, the third active-to-active space S3 of the IC 10c may correspond to a sum of the second distance D2 of the second standard cell C2 and the first distance D1 of the third standard cell C3. In some example embodiments, in each standard cell, the first distance D1 may be substantially equal to the second distance D2, and the first and second distances D1 and D2 may be constant regardless of the heights of the first and second active areas AR1 and AR2. Therefore, the second distance D2 of the second standard cell C2 may be substantially equal to the first distance D1 of the third standard cell C3. In this case, the number of the second dummy fins DF2 of the second standard cell C2 is one and the number of the first dummy fins DF1 of the third standard cell C3 is one. Therefore, the number of the dummy fins disposed in the third active-to-active space S3 is two.

Figure 2D:
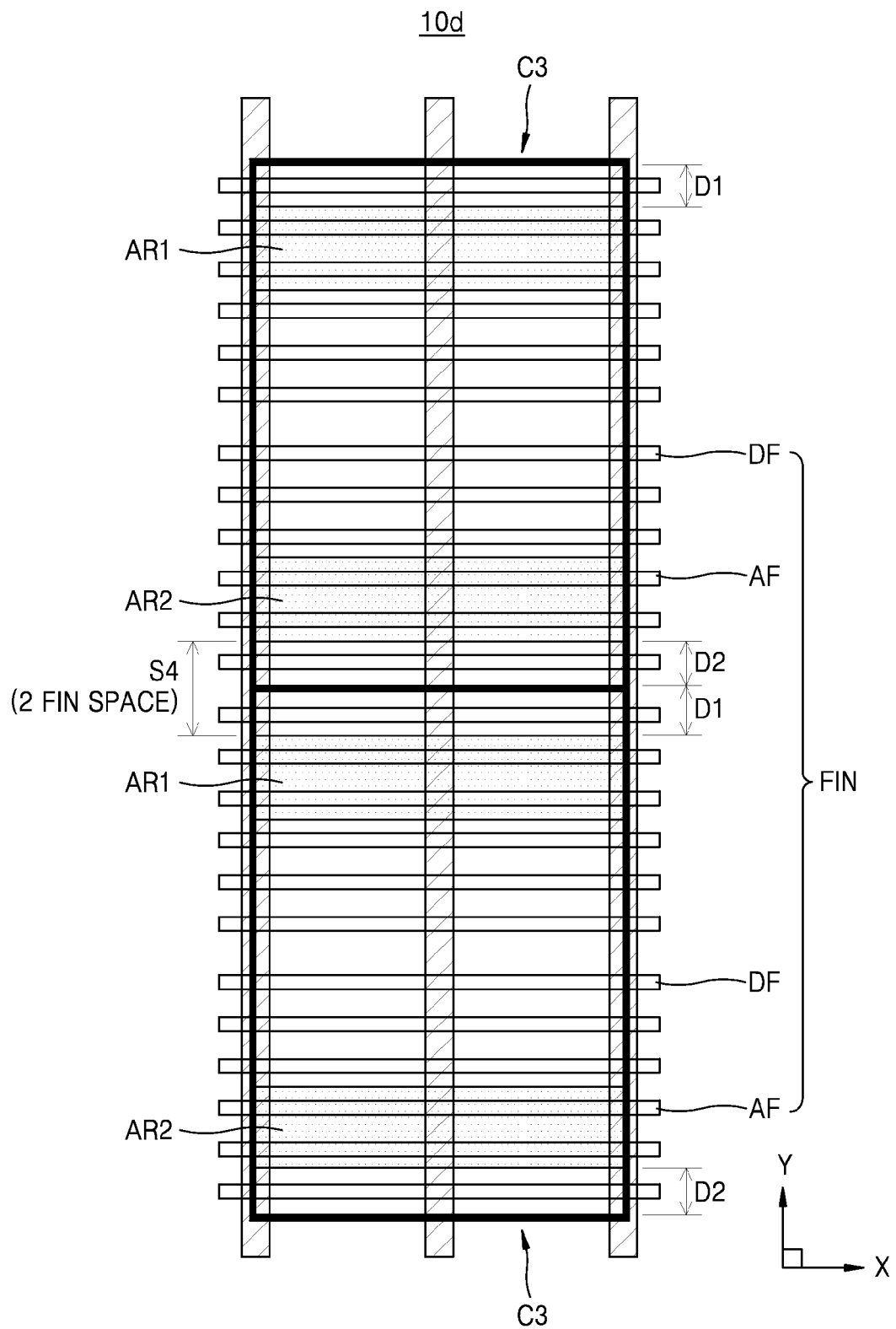

Referring to FIG. 2D, an IC 10d may include the third standard cell C3 and the third standard cell C3 disposed adjacent to each other in the second direction. In this case, the third standard cell C3 disposed on the upper side and the third standard cell C3 disposed on the lower side may correspond to the standard cell C3 of FIG. 1C. Hereinafter, a space between the second active area AR2 of the third standard cell C3 disposed on the upper side and the first active area AR1 of the third standard cell C3 disposed on the lower side is also referred to as a fourth active-to-active space S4.

In some example embodiments, the fourth active-to-active space S4 of the IC 10d may be a fixed space. Specifically, the fourth active-to-active space S4 of the IC 10d may correspond to a sum of the second distance D2 of the third standard cell C3 and the first distance D1 of the third standard cell C3. In some example embodiments, the first distance D1 of the third standard cell C3 may be substantially equal to the second distance D2 of the third standard cell C2. In this case, the number of the second dummy fins DF2 of the third standard cell C3 is one and the number of the first dummy fins DF1 of the third standard cell C3 is one. Therefore, the number of the dummy fins disposed in the fourth active-to-active space S4 is two.

As described above with reference to FIGS. 2A to 2D, according to some example embodiments, a space between the active areas respectively included in two adjacent standard cells, that is, an active-to-active space may have a constant value, regardless of the number of the first and second active fins included in each standard cell. Therefore, it is possible to optimize performance of a target standard cell by minimizing influence of an active area included in a standard cell adjacent to a target standard cell on the target standard cell.

Generally, it is possible to design a layout of a standard cell according to characteristics of the target standard cell itself in a process of designing a standard cell, that is, a process of generating a standard cell library. However, in a process of arranging standard cells, layout patterns of an adjacent standard cell may be changed. Specifically, characteristics of a target standard cell, for example, timing characteristics may be changed due to an active area, conductive lines, or contacts included in the adjacent standard cell. As described above, the phenomenon in which characteristics of a device corresponding to the target standard cell are changed according to peripheral layout patterns is called "local layout effect (LLE)". Hereinafter, LLE will be described with reference to FIGS. 3A to 6.

Figure 3A:
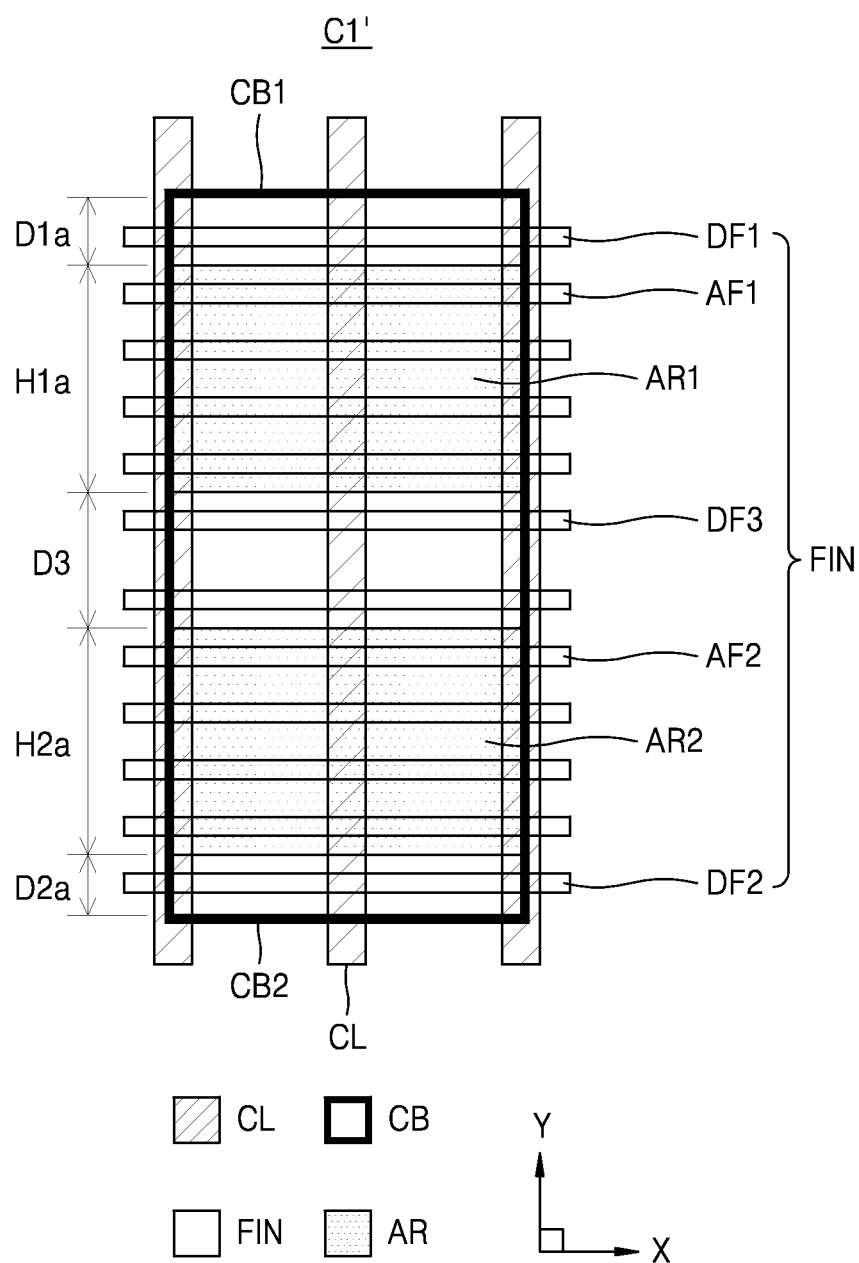
FIGS. 3A to 3C are layouts of standard cells according to comparative examples for comparison with the example embodiments illustrated in FIGS. 1A to 1C.
Figure 3B:
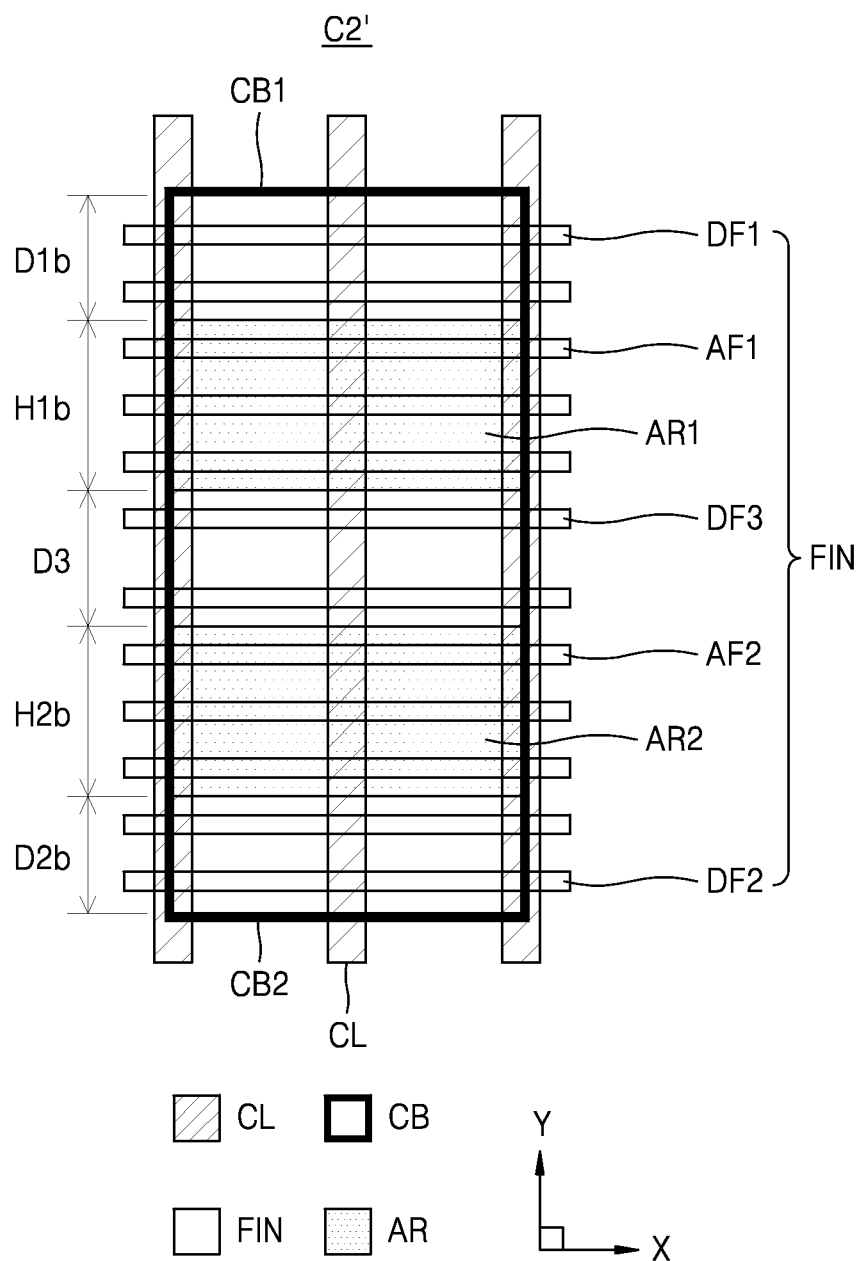
Figure 3C:
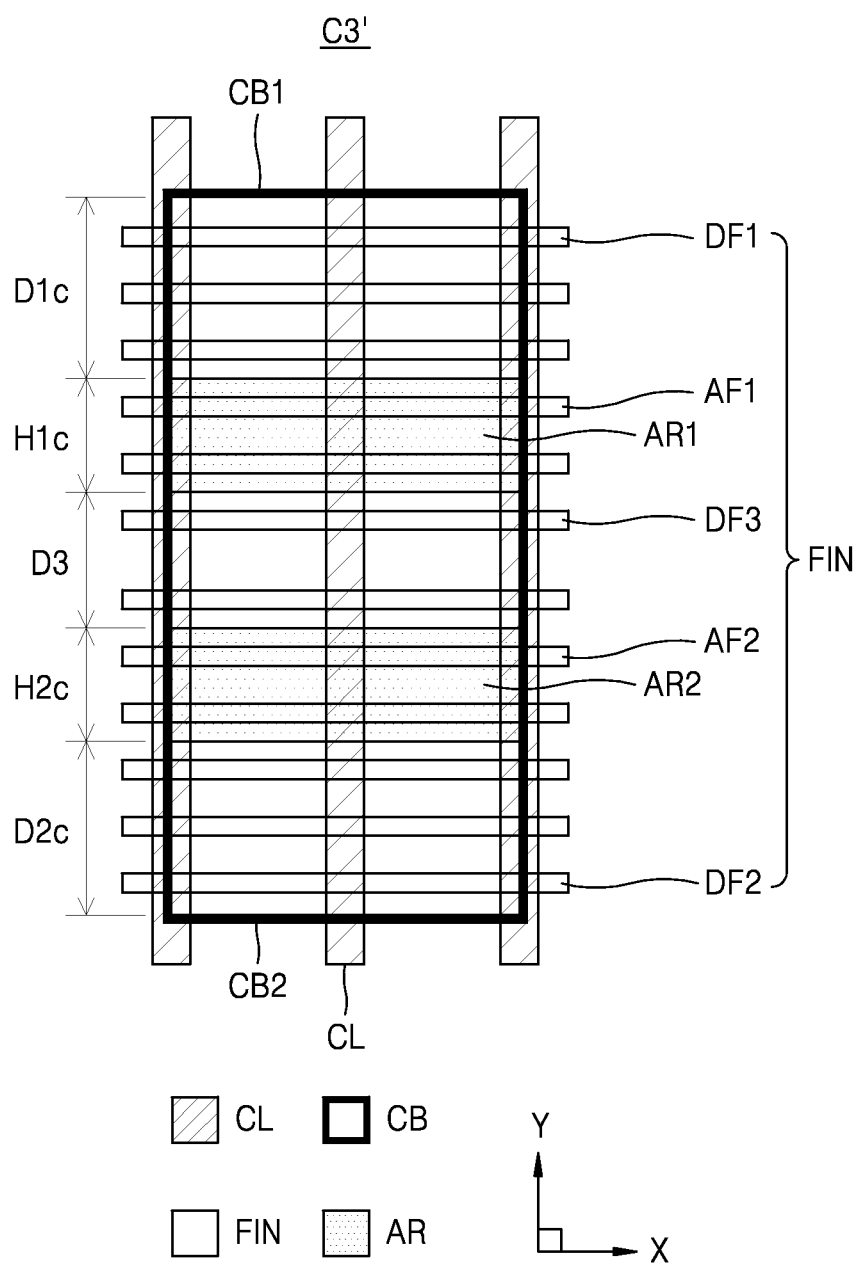

FIGS. 3A to 3C are layouts of standard cells according to comparative examples for the example embodiments illustrated in FIGS. 1A to 1C.

Referring to FIG. 3A, a standard cell C1' may include a plurality of fins FIN, first and second active areas AR1 and AR2, and a plurality of conductive lines CL. Specifically, the standard cell C1' may include four first active fins AF1, four second active fins AF2, one first dummy fin DF1, one second dummy fin DF2, and two third dummy fins DF3.

Referring to FIG. 3B, a standard cell C2' may include a plurality of fins FIN, first and second active areas AR1 and AR2, and a plurality of conductive lines CL. Specifically, the standard cell C2' may include three first active fins AF1, three second active fins AF2, two first dummy fins DF1, two second dummy fins DF2, and two third dummy fins DF3.

The number of the first active fins AF1 and the number of the second active fins AF2 in the standard cell C2' are smaller than those in FIG. 3A. Thus, the first and second heights H1b, and H2b of the first and second active areas AR1 and AR2 are also smaller than the first and second heights H1a and H2a in FIG. 3A. In this case, the first and second active areas AR1 and AR2 are disposed toward a center of the standard cell C2' such that the third distance D3 between the first active area AR1 and the second active area AR2 is equal to the third distance D3 of FIG. 3A.

Referring to FIG. 3C, a standard cell C3' may include a plurality of fins FIN, first and second active areas AR1 and AR2, and a plurality of conductive lines CL. Specifically, the standard cell C3' may include two first active fins AF1, two second active fins AF2, three first dummy fins DF1, three second dummy fins DF2, and two third dummy fins DF3.

The number of the first active fins AF1 and the number of the second active fins AF2 in the standard cell C3' are smaller than those in FIG. 3B. Thus, the first and second heights H1c, and H2c of the first and second active areas AR1 and AR2 are also smaller than the first and second heights H1b and H2b in FIG. 3B. In this case, the first and second active areas AR1 and AR2 are disposed toward a center of the standard cell C3' such that the third distance D3 between the first active area AR1 and the second active area AR2 is equal to the third distance D3 of FIG. 3B.

Referring to FIGS. 3A to 3C, when the number of the first active fins AF1 and the number of the second active fins AF2 are changed, the first and second heights of the first and second active areas AR1 and AR2 are changed. In this case, the first and second active areas AR1 and AR2 are disposed based on the third distance D3 between the first and second active areas AR1 and AR2. In order words, the first and second active areas AR1 and AR2 are designed to be inbound toward a center of a cell. Therefore, when the number of the first active fins AF1 and the number of the second active fins AF2 are changed, the first distance between the first cell boundary line CB1 and the first active area AR1 and the second distance between the second cell boundary line CB2 and the second active area AR2 are changed.

FIGS. 4A to 4D are layouts of parts of ICs including the standard cells according to FIGS. 3A to 3C.

Figure 4A:
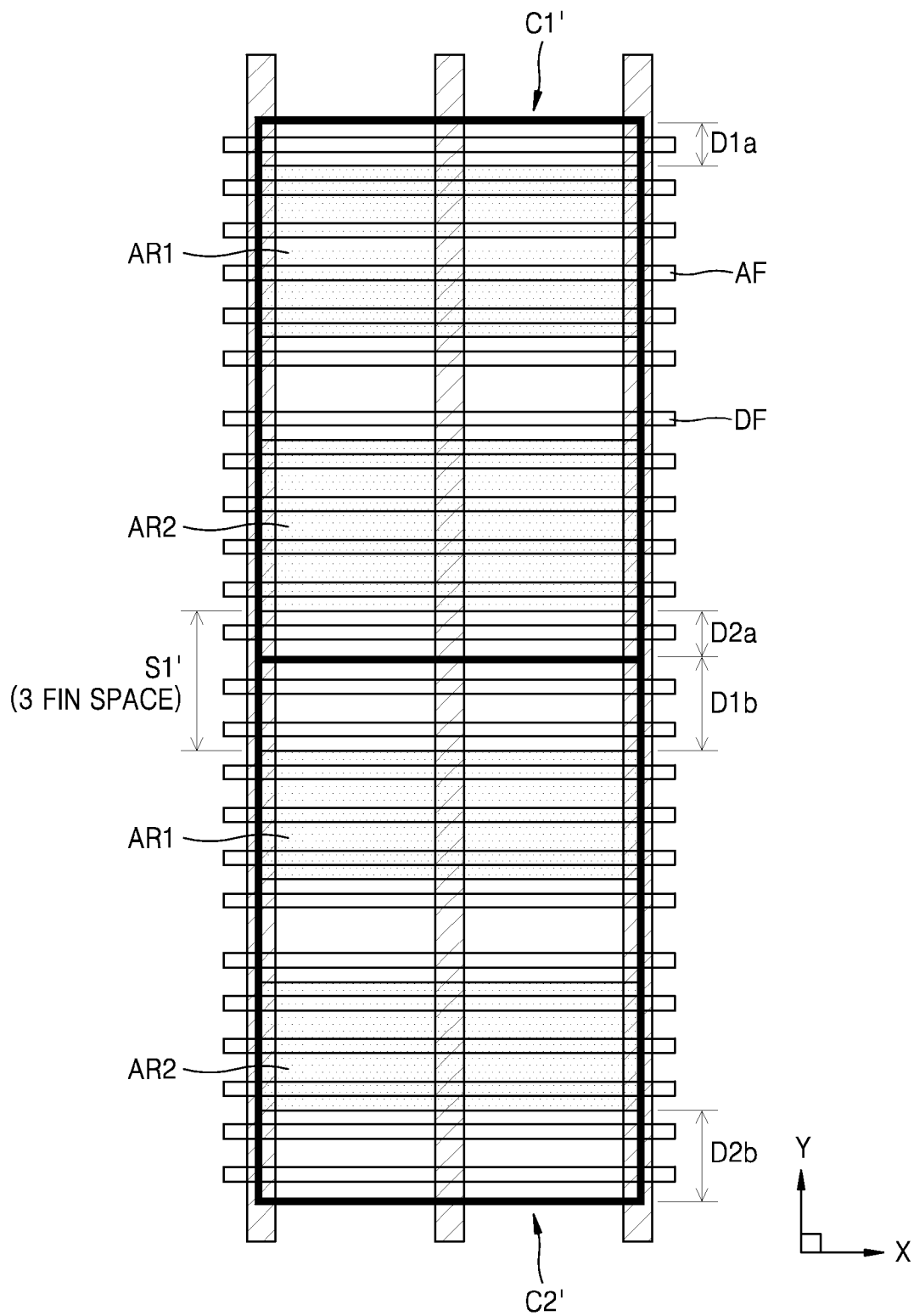
FIGS. 4A to 4D are layouts of parts of ICs including the standard cells illustrated in FIGS. 3A to 3C.

Referring to FIG. 4A, an IC 20a may include the first standard cell C1' and the second standard cell C2' adjacent to each other in the second direction. In this case, the first standard cell C1' disposed on the upper side may correspond to the standard cell C1' of FIG. 3A, and the second standard cell C2' disposed on the lower side may correspond to the standard cell C2' of FIG. 3B. Hereinafter, a space between the second active area AR2 of the first standard cell C1' disposed on the upper side and the first active area AR1 of the second standard cell C2' disposed on the lower side is also referred to as a first active-to-active space S1'.

Specifically, the first active-to-active space S1' of the IC 20a may correspond to a sum of the second distance D2a of the first standard cell C1' and the first distance D1b of the second standard cell C2'. In this case, the number of the second dummy fins DF2 of the first standard cell C1' is one and the number of the first dummy fins DF1 of the second standard cell C2' is two. Therefore, the number of the dummy fins disposed in the first active-to-active space S1' is three.

Figure 4B:
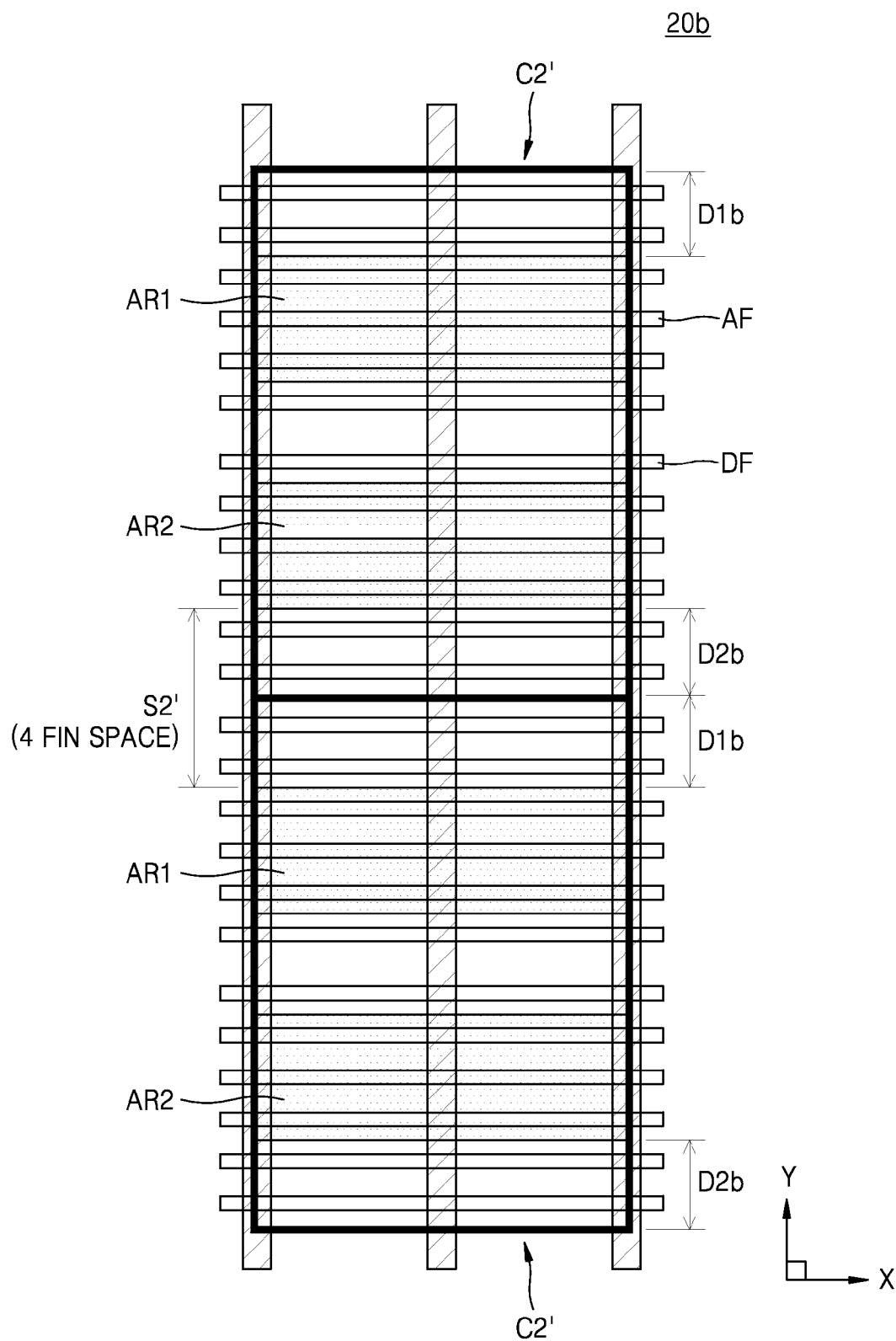

Referring to FIG. 4B, an IC 20b may include the second standard cell C2' and the second standard cell C2' disposed adjacent to each other in the second direction. In this case, the second standard cell C2' disposed on the upper side and the second standard cell C2' disposed on the lower side correspond to the standard cell C2' of FIG. 3B. Hereinafter, a space between the second active area AR2 of the second standard cell C2' disposed on the upper side and the first active area AR1 of the second standard cell C2' disposed on the lower side is referred to as a second active-to-active space S2'.

Specifically, the second active-to-active space S2' of the IC 20b corresponds to a sum of the second distance D2b of the second standard cell C2' and the first distance D1b of the second standard cell C2'. In this case, the number of the second dummy fins DF2 of the second standard cell C2' is two and the number of the first dummy fins DF1 of the second standard cell C2' is two. Therefore, the number of the dummy fins disposed in the second active-to-active space S2' is four.

Figure 4C:
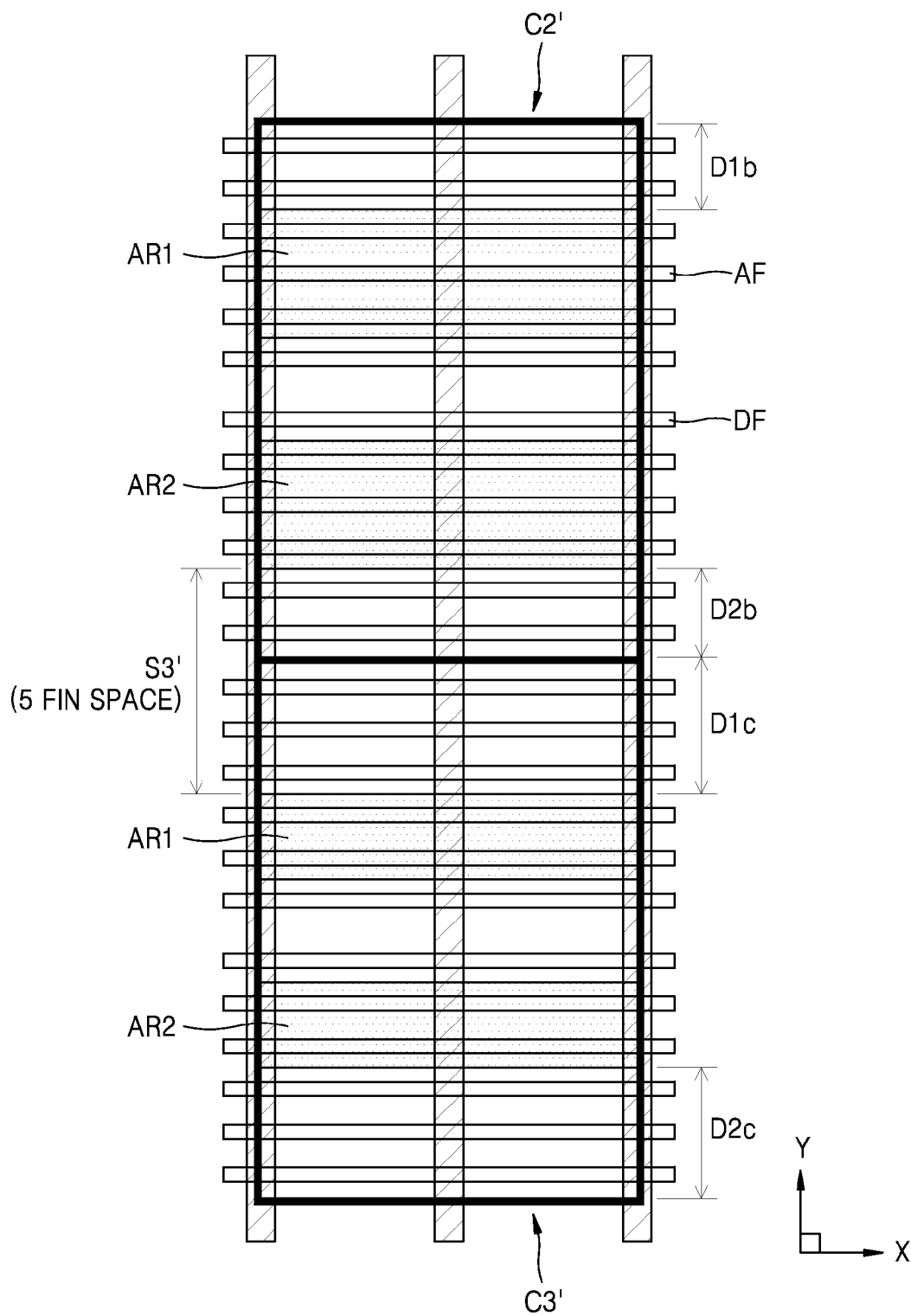

Referring to FIG. 4C, an IC 20c may include the second standard cell C2' and the third standard cell C3' disposed adjacent to each other in the second direction. In this case, the second standard cell C2' disposed on the upper side corresponds to the standard cell C2' of FIG. 3B, and the third standard cell C3' disposed on the lower side corresponds to the standard cell C3' of FIG. 3C. Hereinafter, a space between the second active area AR2 of the second standard cell C2' disposed on the upper side and the first active area AR1 of the third standard cell C3' disposed on the lower side is referred to as a third active-to-active space S3'.

Specifically, the third active-to-active space S3' of the IC 20c corresponds to a sum of the second distance D2b of the second standard cell C2' and the first distance D1c of the third standard cell C3'. In this case, the number of the second dummy fins DF2 of the second standard cell C2' is two and the number of the first dummy fins DF1 of the third standard cell C3' is three. Therefore, the number of the dummy fins disposed in the third active-to-active space S3' is five.

Figure 4D:
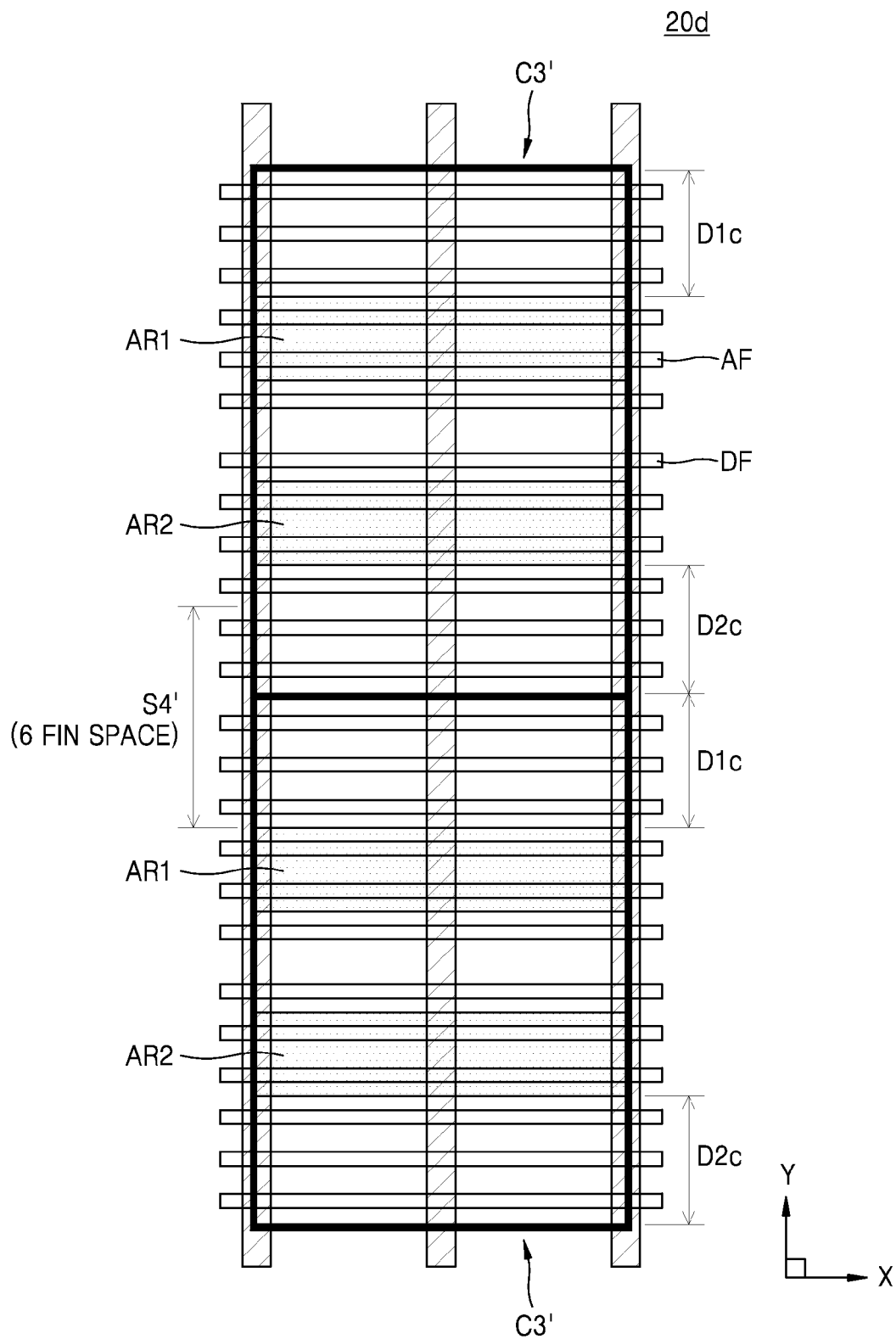

Referring to FIG. 4D, an IC 20d may include the third standard cell C3' and the third standard cell C3' disposed adjacent to each other in the second direction. In this case, the third cell C3' disposed on the upper side and the third standard cell C3' disposed on the lower side correspond to the standard cell C3' of FIG. 3C. Hereinafter, a space between the second active area AR2 of the third standard cell C3' disposed on the upper side and the first active area AR1 of the third standard cell C3' disposed on the lower side is also referred to as a fourth active-to-active space S4'.

Specifically, the fourth active-to-active space S4' of the IC 20d may correspond to a sum of the second distance D2c of the third standard cell C3' and the first distance D1c of the third standard cell C3'. In this case, the number of the second dummy fins DF2 of the third standard cell C3' is three and the number of the first dummy fins DF1 of the third standard cell C3' is three. Therefore, the number of the dummy fins disposed in the fourth active-to-active space S4' is six.

As described above, in a case in which the first and second active areas are designed to be disposed toward the center of a cell in each standard cell, when two standard cells are disposed adjacent to each other, the active-to-active space of an IC is changed depending on the number of active fins included in the each standard cell, that is, the heights of active areas. In order words, the number of dummy cells disposed in the active-to-active space may be changed depending on the number of active fins included in the each standard cell, that is, the heights of active areas.

In a case in which the active areas are designed to be inbound in a standard cell as illustrated in FIGS. 3A to 3C, an active-to-active space may be changed according to an adjacent standard cell upon placement of standard cells, and therefore, characteristics of a target standard cell may be changed. Because the number of active fins included in the adjacent standard cell cannot be predicted in the case of designing the target standard cell, it is hard to design the target standard cell such that the characteristics of the target standard cell are changed according to the number of active fins included in the adjacent standard cell.

As described above, there may be a difference between a layout generated through the design of the standard cell and an actual device manufactured through placement of standard cells. Such a difference may increase uncertainty in a manufactured actual silicon device. Thus, a model hardware correlation (MHC) issue may occur. In the worst case, the device may be failed. As a result, there is a need to minimize an LLE problem and remove uncertainty in MHC.

Figure 5:
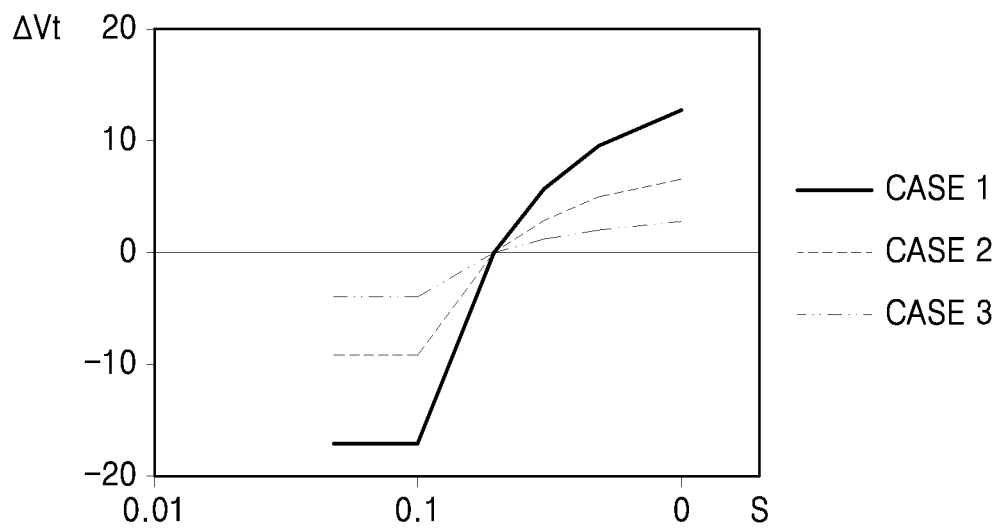
FIG. 5 is a graph of a change in voltage of a standard cell with respect to an active-to-active space.

FIG. 5 is a graph of a change in voltage of a standard cell with respect to an active-to-active space.

Referring to FIG. 5, an X axis denotes an active-to-active space between two adjacent active areas respectively included in a target standard cell $C_{tg}$ and an adjacent standard cell $C_{adj}$, and a Y axis denotes a change in voltage of a transistor included in the target standard cell $C_{tg}$. First to third cases CASE1, CASE2, and CASE3 are classified according to a size of each conductive line (for example, CL of FIG. 1A) included in the standard cell in a first direction (for example, X direction) (hereinafter, referred to as a "length"). The first case CASE1 is a case in which the length of the conductive line is shortest, the second case CASE2 is a case in which the length of the conductive line is longer than that in the first case CASE1, and the third case CASE3 is a case in which the length of the conductive line is longer than that in the second case CASE2.

In the third case CASE3, the change in the voltage of the transistor included in the target standard cell $C_{tg}$ is not large even when the active-to-active space is changed. In the second case CASE2, as the active-to-active space varies, the change in the voltage of the transistor included in the target standard cell $C_{tg}$ is larger than that in the third case CASE3. In the first case CASE1, as the active-to-active space varies, the change in the voltage of the transistor included in the target standard cell $C_{tg}$ is much larger than those in the second case CASE2 and the third case CASE3.

Figure 6:
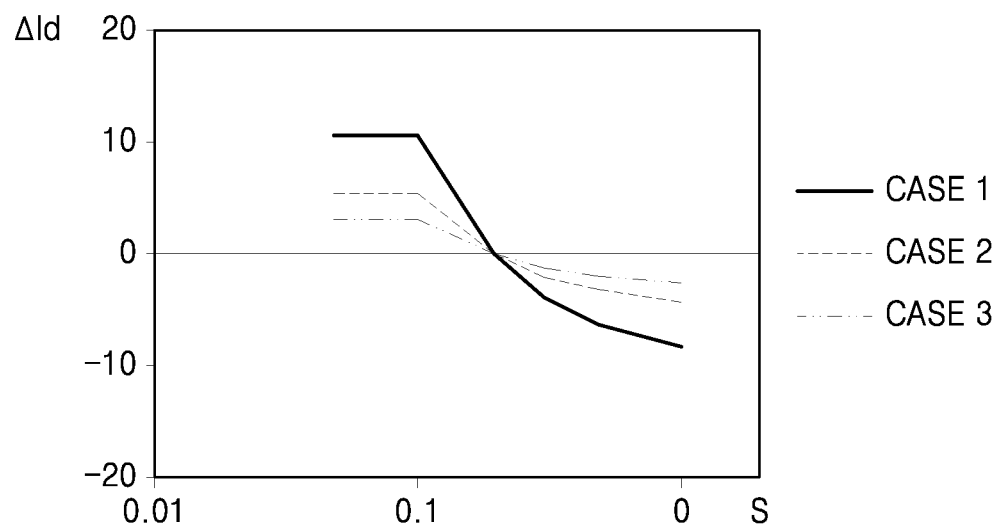
FIG. 6 is a graph of a change in a current of a standard cell with respect to an active-to-active space.

FIG. 6 is a graph of a change in current of a standard cell with respect to an active-to-active space.

Referring to FIG. 6, an X axis denotes an active-to-active space between two adjacent active areas respectively included in a target standard cell $C_{tg}$ and an adjacent standard cell $C_{adj}$, and a Y axis denotes a change in current of a transistor included in the target standard cell $C_{tg}$. First to third cases CASE1, CASE2, and CASE3 are classified according to a size of each conductive line (for example, CL of FIG. 1A) included in the standard cell in a first direction (for example, X direction) (that is, a length). The first case CASE1 is a case in which the length of the conductive line is shortest, the second case CASE2 is a case in which the length of the conductive line is longer than that in the first case CASE1, and the third case CASE3 is a case in which the length of the conductive line is longer than that in the second case CASE2.

In the third case CASE3, the change in the current of the transistor included in the target standard cell $C_{tg}$ is not large in spite of a change in the active-to-active space. In the third case CASE2, as the active-to-active space varies, the change in the current of the transistor included in the target standard cell $C_{tg}$ is larger than that in the third case CASE3. In the first case CASE1, as the active-to-active space varies, the change in the current of the transistor included in the target standard cell $C_{tg}$ is much larger than those in the second case CASE2 and the third case CASE3.

As described with reference to FIGS. 5 and 6, it can be seen that, as it gets from the third case CASE3 to the first case CASE1, that is, as the length of the conductive line included in the standard cell decreases, a change in voltage/current of the transistor included in the target standard cell $C_{tg}$ according to the change in the active-to-active space increases. With the development of semiconductor processing technologies, reduction in size of the reduction in size of a transistor is accelerated and a length of a conductive line included in a standard cell tends to be reduced.

According to some example embodiments, as illustrated in FIGS. 1A to 1C, it is possible to design the active areas to be outbound in a standard cell. Specifically, it is possible to design a standard cell such that an active-to-active space is constant upon design of the standard cell. Therefore, the active-to-active space is constant regardless of an adjacent standard cell when standard cells are disposed, and the characteristics of the standard target cell $C_{tg}$ are maintained.

Figure 7:
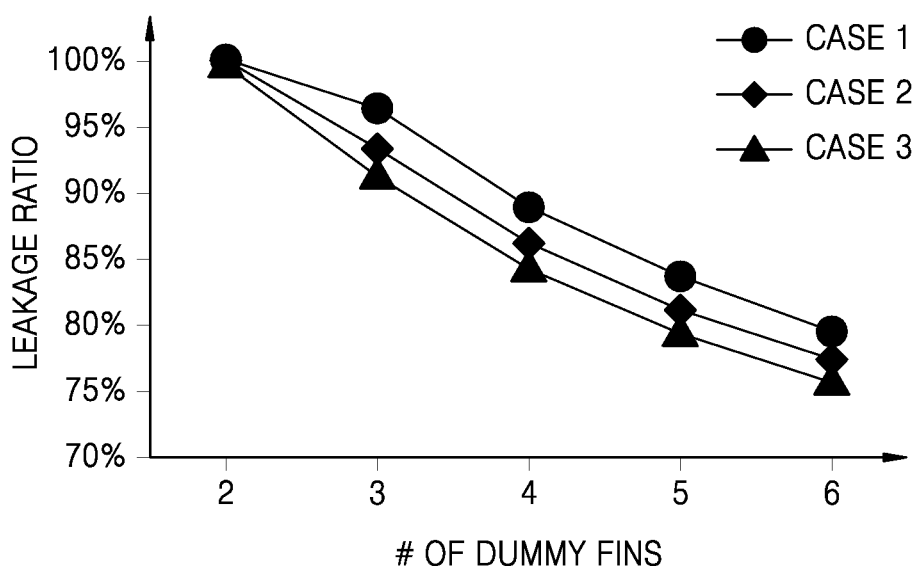
FIG. 7 is a graph of a leakage current ratio with respect to the number of dummy fins disposed in an active-to-active space in an IC according to some example embodiments of the inventive concepts.

FIG. 7 is a graph of a leakage current ratio with respect to the number of dummy fins disposed in an active-to-active space in an IC according to some example embodiments of the inventive concepts.

Referring to FIG. 7, an X axis denotes the number of fins disposed in an active-to-active space between two adjacent active areas respectively included in a target standard cell $C_{tg}$ and an adjacent standard cell $C_{adj}$, and a Y axis denotes a leakage current ratio in a device corresponding to the target standard cell $C_{tg}$. As the active-to-active space increases, the number of the dummy fins disposed in the active-to-active space may increase. Therefore, it is expected that the number of the dummy fins disposed in the active-to-active space is proportional to the active-to-active space.

As illustrated in the graph of FIG. 7, as the number of the dummy fins disposed in the active-to-active space increases, the leakage current ratio of the device decreases. Therefore, in order to minimize a leakage current of the device, it may be advantageous to set the active-to-active space to be relatively large.

Figure 8:
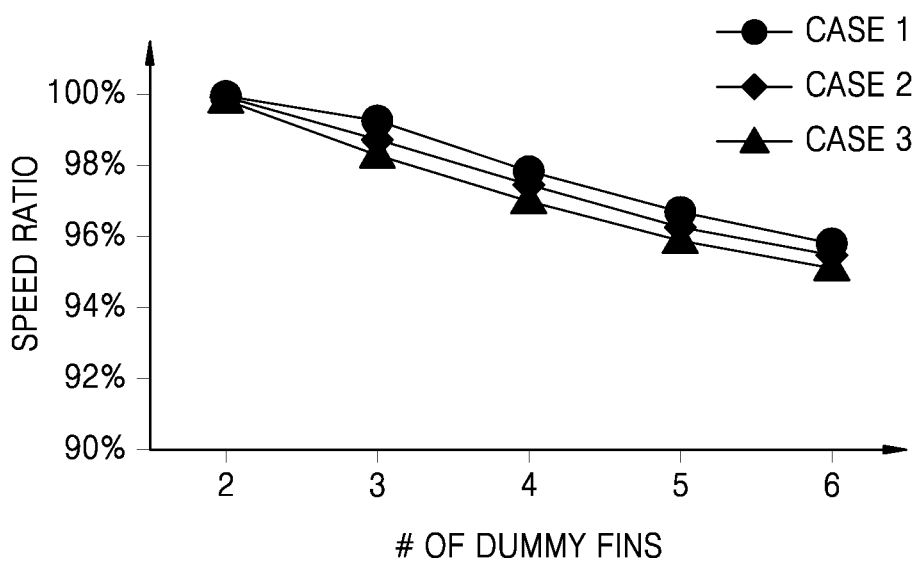
FIG. 8 is a graph of an operation speed ratio with respect to the number of dummy fins disposed in an active-to-active space in an IC according to some example embodiments of the inventive concepts.

FIG. 8 is a graph of an operation speed ratio with respect to the number of dummy fins disposed in an active-to-active space in an IC according to some example embodiments of the inventive concepts.

Referring to FIG. 8, an X axis denotes the number of fins disposed in an active-to-active space between two adjacent active areas respectively included in a target standard cell $C_{tg}$ and an adjacent standard cell $C_{adj}$, and a Y axis denotes an operation speed ratio in a device corresponding to the target standard cell $C_{tg}$. As the active-to-active space increases, the number of the dummy fins disposed in the active-to-active space may increase. Therefore, it is expected that the number of the dummy fins disposed in the active-to-active space is proportional to the active-to-active space.

As illustrated in the graph of FIG. 8, as the number of the dummy fins disposed in the active-to-active space increases, the operation speed ratio of the device decreases. Therefore, in order to maximize an operation speed of the device, it may be advantageous to set the active-to-active space to be relatively small.

Referring to FIGS. 7 and 8, it can be seen that the leakage current and the operation speed of the device are in a trade-off relationship. Thus, according to some example embodiments, it is possible to determine the active-to-active space in consideration of the leakage current and the operation speed of the device corresponding to the standard cell in the case of designing the standard cell. Also, it is possible to determine a first distance between a first cell boundary line and a first active area and a second distance between a second boundary line and a second active area in each standard cell based on the determined active-to-active space. In some example embodiments, the first distance and the second distance may be determined so as to have a constant value regardless of the number of active fins included in the standard cell or a height of the active area.

Figure 9:
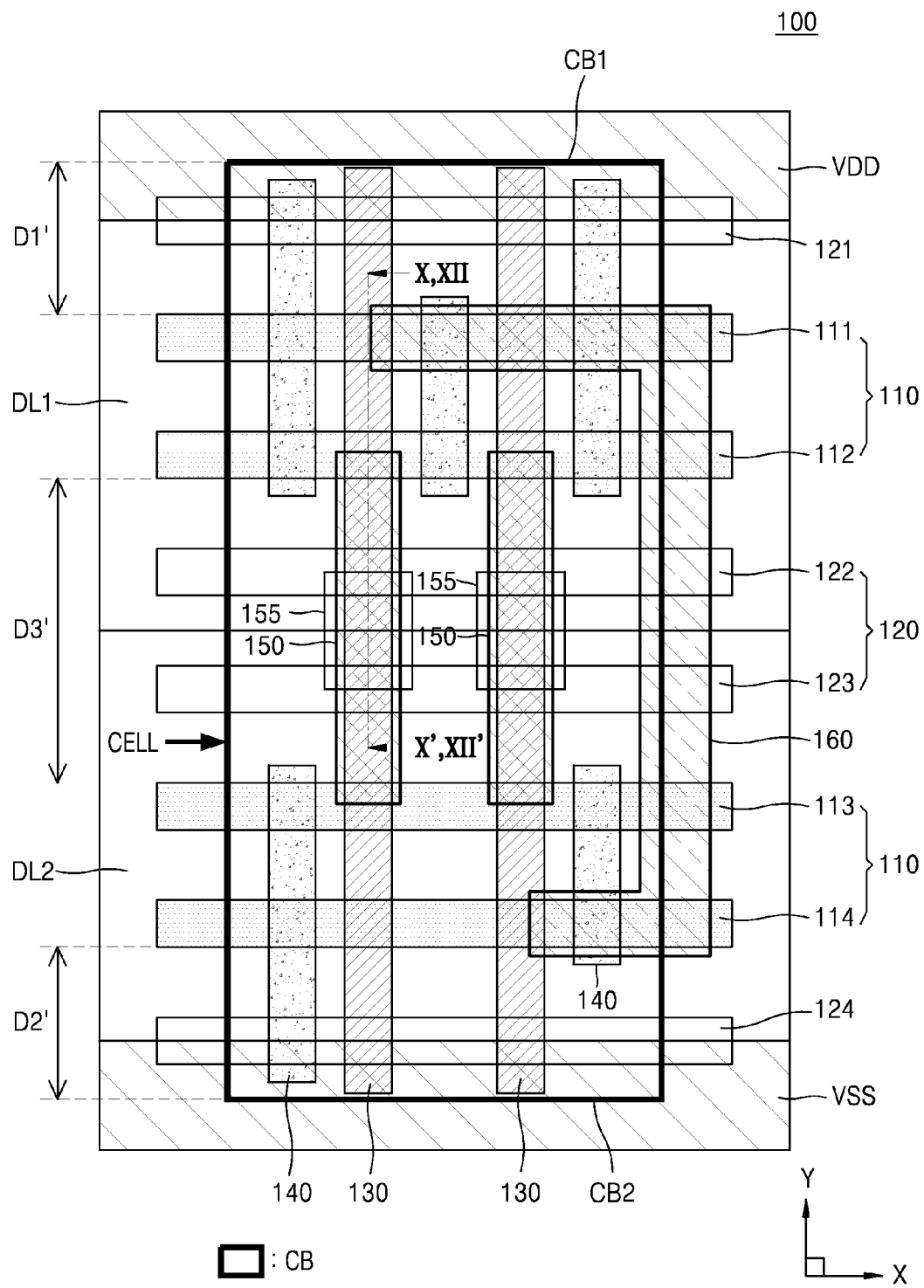
FIG. 9 is a layout of a part of an IC according to some example embodiments of the inventive concepts.

FIG. 9 is a layout of a part of an IC according to some example embodiments of the inventive concepts.

Referring to FIG. 9, an IC 100 may include at least one cell CELL defined by a cell boundary CB indicated by a thick solid line. The cell CELL may include a plurality of fins including a plurality of active fins 110 and a plurality of dummy fins 120, a plurality of gate electrodes 130, a plurality of source/drain contacts 140, two input terminals 150, two input contacts 155, an output terminal 160, and two power supply lines VDD and VSS. Although not illustrated, a plurality of conductive lines, for example, metal lines may be further disposed on the cell CELL.

In some example embodiments, the cell CELL may be a standard cell. A standard cell-based layout design method is to previously design elements such as an OR gate or an AND gate, which are repeatedly used, as standard cells, store the standard cells in a computer system, and perform placement and routing for the standard cells at appropriate locations upon layout design, thereby reducing time required for layout design.

The plurality of active fins 110 may include first to fourth active fins 111 to 114. However, the number of the plurality of active fins 110 included in one cell CELL is not limited to four, and may be changed variously according to example embodiments. In some example embodiments, the number of the plurality of active fins 110 included in the one cell CELL may be larger than four, and in some example embodiments, the number of the plurality of active fins 110 included in the one cell CELL may be smaller than four.

The active fins of the first to fourth active fins 111 to 114, which are disposed adjacent to one another, may constitute one fin transistor. Thus, a channel width of the fin transistor may increase in proportion to the number of the active fins constituting the one fin transistor, and therefore, the amount of current flowing through the fin transistor may increase.

The plurality of dummy fins 120 may include first to fourth dummy fins 121 to 124. However, the number of the plurality of dummy fins 120 included in one cell CELL is not limited to four, and may be changed variously according to some example embodiments. In some example embodiments, the number of the plurality of dummy fins 120 included in the one cell CELL may be larger than four, and in some example embodiments, the number of the plurality of dummy fins 120 included in the one cell CELL may be smaller than four.

The first and second active fins 111 and 112, and the first and second dummy fins 121 and 122, may be disposed in a first defining layer DL1. The third and fourth active fins 113 and 114, and the third and fourth dummy fins 123 and 124 may be disposed in a second defining layer DL2. In some example embodiments, the first defining layer DL1 may be a PMOS defining layer doped with P+ impurities, and the second defining layer DL2 may be an NMOS defining layer doped with N+ impurities. As described above, the first and second active fins 111 and 112 disposed in the first defining layer DL1 may constitute a PMOS fin transistor, and the third and fourth active fins 113 and 114 disposed in the second defining layer DL2 may constitute an NMOS fin transistor.

Specifically, because the two gate electrodes 130 and the three source/drain contacts 140 are disposed on the first and second active fins 111 and 112, the first and second active fins 111 and 112 may constitute two PMOS fin transistors connected in parallel to each other. Specifically, because the two gate electrodes 130 and the three source/drain contacts 140 are disposed on the third and fourth active fins 113 and 114, the third and fourth active fins 113 and 114 may constitute two NMOS fin transistors connected in series to each other.

The first to fourth active fins 111 to 114, and the first to fourth dummy fins 121 to 124 may extend in a first direction (for example, X direction) and may be disposed in parallel to one another in a second direction (for example, Y direction). In this case, the second direction may be substantially perpendicular to the first direction.

In the some example embodiments, a first distance D1' between the first active fin 111 and the first cell boundary line CB1, and a second distance D2' between the fourth active fin 114 and the second cell boundary line CB2 may be constant regardless of the number of active fins included in one cell CELL. On the other hand, a third distance D3' between the second active fin 112 and the third active fin 113 may be changed depending on the number of active fins included in the one cell CELL.

According to some example embodiments, when two cells are disposed adjacent to each other in the second direction (for example, the Y direction), the active-to-active space between the lowermost active fin of a cell disposed on the upper side and the uppermost active fin of a cell disposed on the lower side may be always constant. Accordingly, it is possible to minimize a change in characteristics of a target cell due to active fins included in an adjacent cell.

Figure 10:
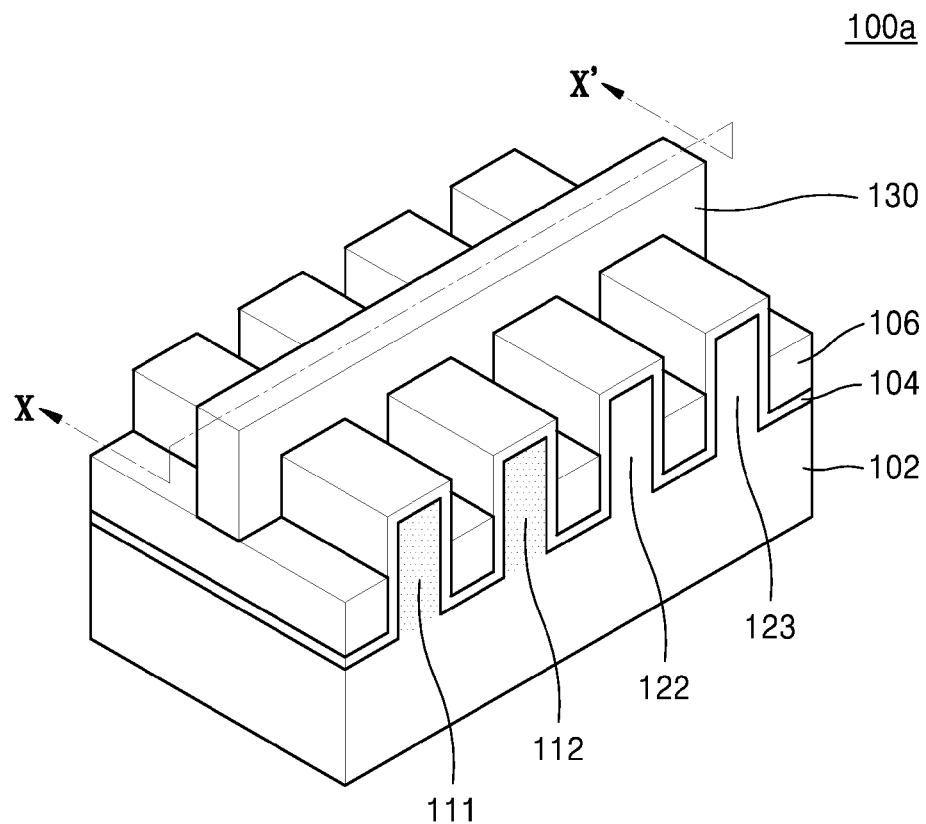
FIG. 10 is a perspective view of an example of a semiconductor device having a layout of FIG. 9.
Figure 11:
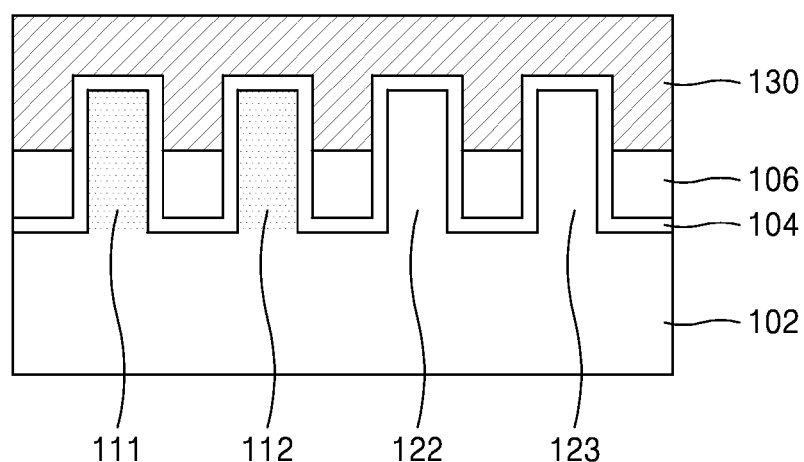
FIG. 11 is a cross-sectional view taken along line X-X' of FIG. 10.

FIG. 10 is a perspective view of an example of a semiconductor device having the layout of FIG. 9. FIG. 11 is a cross-sectional view taken along line X-X' of FIG. 10.

Referring to FIGS. 10 and 11, a semiconductor device 100a may be a bulk type fin transistor. The semiconductor device 100a may include a substrate 102, a first insulating layer 104, a second insulating layer 106, first and second active fins 111 and 112, second and third dummy fins 122 and 123, and a gate electrode 130.

The substrate 102 may be a semiconductor substrate, and may include one selected from the group consisting of silicon, silicon-on-insulator (SOI), silicon-on-sapphire, germanium, silicon-germanium, and gallium-arsenide.

The first and second active fins 111 and 112, and the second and third dummy fins 122 and 123 may be disposed to be connected to the substrate 102. In some example embodiments, the first and second active fins 111 and 112 may be an active area in which a protruding portion perpendicularly from the substrate 102 is doped with n+ or p+ impurities, and the second and third dummy fins 122 and 123 may be an area in which a protruding portion perpendicularly from the substrate 102 is not doped. In some example embodiments, the first and second active fins 111 and 112, and the second and third dummy fins 122 and 123, may be all an active region doped with n+ or p+ impurities.

The first and second insulating layers 104 and 106 may include an insulating material. For example, the insulating material may include one selected from the group consisting of oxide, nitride, and oxynitride. The first insulating layer 104 may be disposed on the first and second active fins 111 and 112, and the second and third dummy fins 122 and 123. The first insulating layer 104 may be disposed between the first and second active fins 111 and 112 and the gate electrode 130 and may be used as a gate insulating film. The second insulating layer 106 may be disposed to have a set (or, alternatively, predetermined) height in a space between the first and second active fins 111 and 112, and the second and third dummy fins 122 and 123. The second insulating layer 106 may be disposed between the first and second active fins 111 and 112, and the second and third dummy fins 122 and 123 and may be used as a device isolation film.

The gate electrode 130 may be disposed on the first and second insulating layers 104 and 106. The gate electrode 130 may be configured to surround the first and second active fins 111 and 112, the second and third dummy fins 122 and 123, and the second insulating layer 106. In other words, the first and second active fins 111 and 112, and the second and third dummy fins 122 and 123 may be disposed within the gate electrode 130. The gate electrode 130 may include a metal, such as tungsten (W) or tantalum (Ta), nitride thereof, silicide thereof, doped polysilicon, or the like and may be formed using a deposition process.

Figure 12:
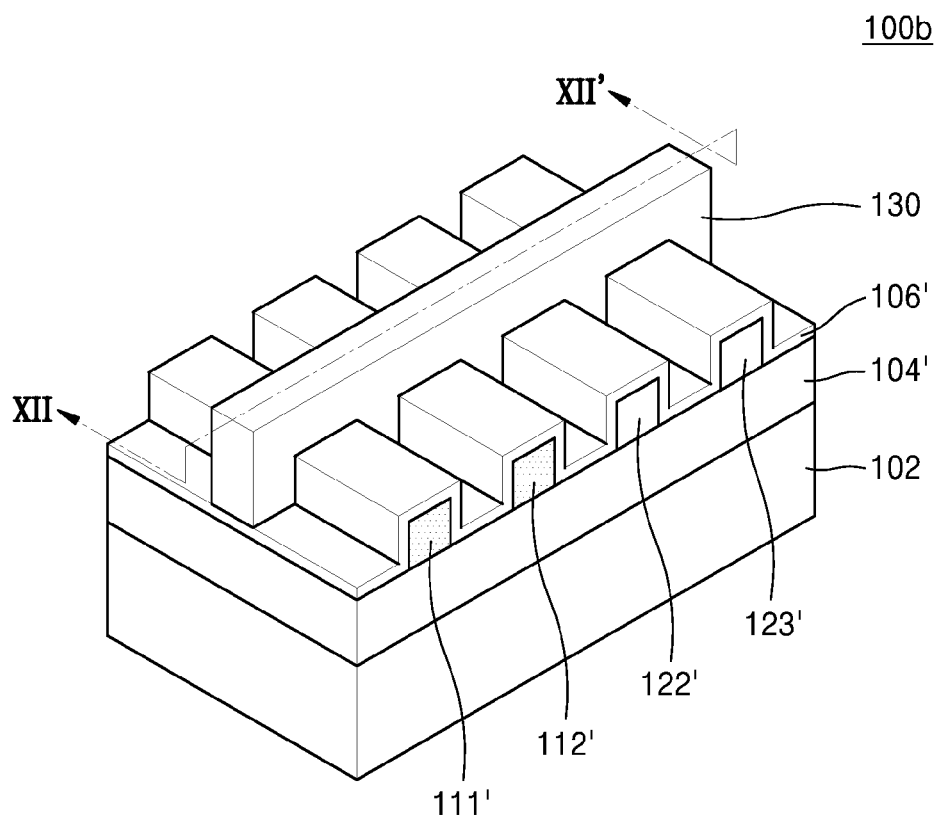
FIG. 12 is a perspective view of another example of a semiconductor device having the layout of FIG. 9.
Figure 13:
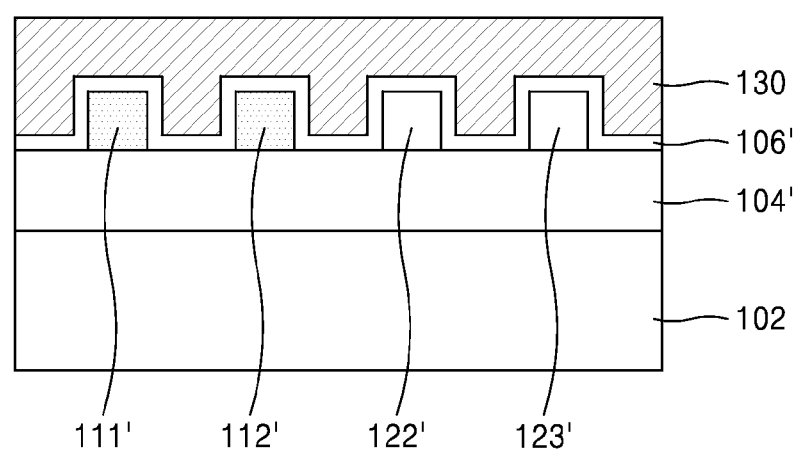
FIG. 13 is a cross-sectional view taken along line XII-XII' of FIG. 12.

FIG. 12 is a perspective view of another example of a semiconductor device having a layout of FIG. 9. FIG. 13 is a cross-sectional view taken along line XII-XII' of FIG. 12.

Referring to FIGS. 12 and 13, a semiconductor device 100b may be an SOI type fin transistor. The semiconductor device 100b may include a substrate 102, a first insulating layer 104', a second insulating layer 106', first and second active fins 111' and 112', second and third dummy fins 122' and 123', and a gate electrode 130. Because the semiconductor device 100b according to some example embodiments is a modification of the semiconductor device 100a illustrated in FIGS. 10 and 11, a difference from the semiconductor device 100a will be described and a redundant description will be omitted for the sake of brevity.

The first insulating layer 104' may be disposed on the substrate 102. The second insulating layer 106 may be disposed between the first and second active fins 111' and 112' and the second and third dummy fins 122' and 123', and the gate electrode 130 and may be used as a gate insulating film. The first and second active fins 111' and 112' and the second and third dummy fins 122' and 123' may be a semiconductor material, for example, silicon or doped silicon.

The gate electrode 130 may be disposed on the second insulating layer 106'. The gate electrode 130 may be configured to surround the first and second active fins 111' and 112', the second and third dummy fins 122' and 123', and the second insulating layer 106'. In other words, the first and second active fins 111' and 112', and the second and third dummy fins 122' and 123' may be disposed within the gate electrode 130.

Figure 14:
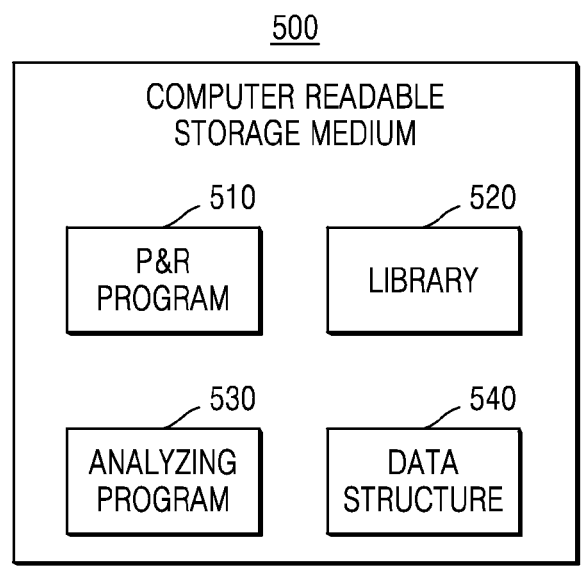
FIG. 14 is a block diagram of a storage medium according to some example embodiments of the inventive concepts.

FIG. 14 is a block diagram of a storage medium according to some example embodiments of the inventive concepts.

Referring to FIG. 14, a storage medium 500 is a computer-readable storage medium and may include any storage media accessible by a computer during use to provide commands and/or data to the computer. For example, the computer-readable storage medium 500 may include magnetic or optical media, e.g., disk, tape, CD-ROM, DVD-ROM, CD-R, CD-RW, DVD-R, DVD-RW, a volatile or non-volatile memory such as RAM, ROM, or flash memory, a non-volatile memory accessible via a USB interface, micro-electro-mechanical systems (MEMS), or the like. The computer-readable storage medium may be inserted into a computer, may be integrated within a computer, or may be connected to a computer via a communication medium, such as a network and/or a radio link.

As illustrated in FIG. 14, the computer-readable storage medium 500 may include a place and route (P&R) program 510, a library 520, an analyzing program 530, and a data structure 540. The P&R program 510 may include a plurality of commands in order to execute a method of designing an IC by using a standard cell library according to some example embodiments of the inventive concepts. For example, the computer-readable storage medium 500 may store the P&R program 510 including any commands for designing an IC using a standard cell library including the standard cell illustrated in one or more of the drawings. The library 520 may include information about a standard cell which is a unit constituting an IC.

The analyzing program 530 may include a plurality of commands that execute a method of analyzing an IC based on data defining an IC. For example, the computer-readable storage medium 500 may store the analyzing program 530 including any commands to execute a method of analyzing timing characteristics of an IC according to an active-to-active space between two standard cells disposed adjacent to each other. The data structure 540 may include a storage space for management of data generated during using the standard cell library included in the library 520, extracting marker information from a general standard cell library included in the library 520, or analyzing timing characteristics of an IC by the analyzing program 530.

Figure 15:
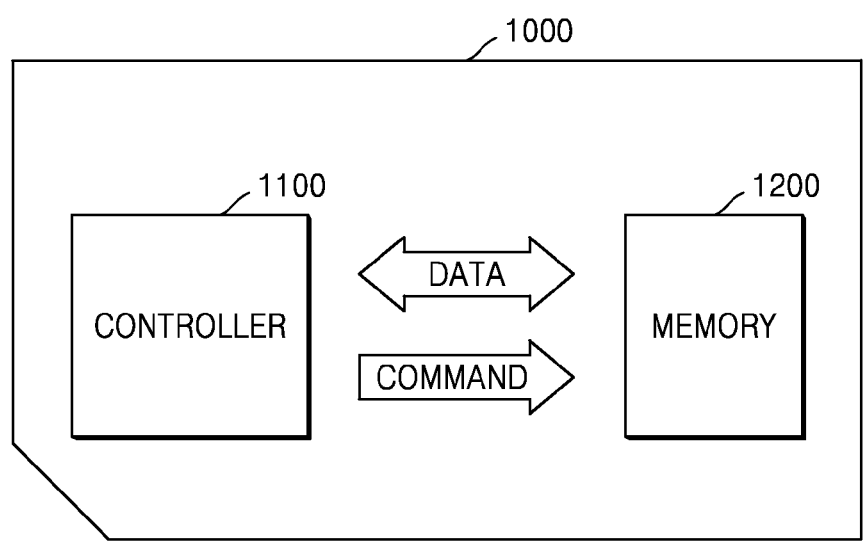
FIG. 15 is a block diagram of a memory card including an IC, according to some example embodiments of the inventive concepts.

FIG. 15 is a block diagram of a memory card including an IC according to some example embodiments of the inventive concepts.

Referring to FIG. 15, a memory card 1000 may be disposed such that a controller 1100 exchanges electric signals with a memory 1200. For example, when the controller 1100 issues a command, the memory 1200 may transmit data.

The controller 1100 and the memory 1200 may include an IC according to example embodiments of the inventive concepts. Specifically, at least one semiconductor device of a plurality of semiconductor devices included in the controller 1100 and the memory 1200, or a fin transistor included in the semiconductor device may include a plurality of fins extending in a first direction (for example, X direction) and disposed parallel to one another in a second direction (for example, Y direction) perpendicular to the first direction, a first active area disposed adjacent to a first cell boundary line parallel to the plurality of fins and to be spaced apart from the first cell boundary line by a first distance, and a second active area disposed adjacent to a second cell boundary line facing the first cell boundary line and to be spaced apart from the second cell boundary line by a second distance, wherein the first and second distances are constant regardless of the number of fins on the first and second active areas.

The memory card 1000 may configure various memory cards, such as a memory stick card, a smart media card (SM), a secure digital card (SD), a mini-secure digital card (mini SD), and a multimedia card (MMC).

Figure 16:
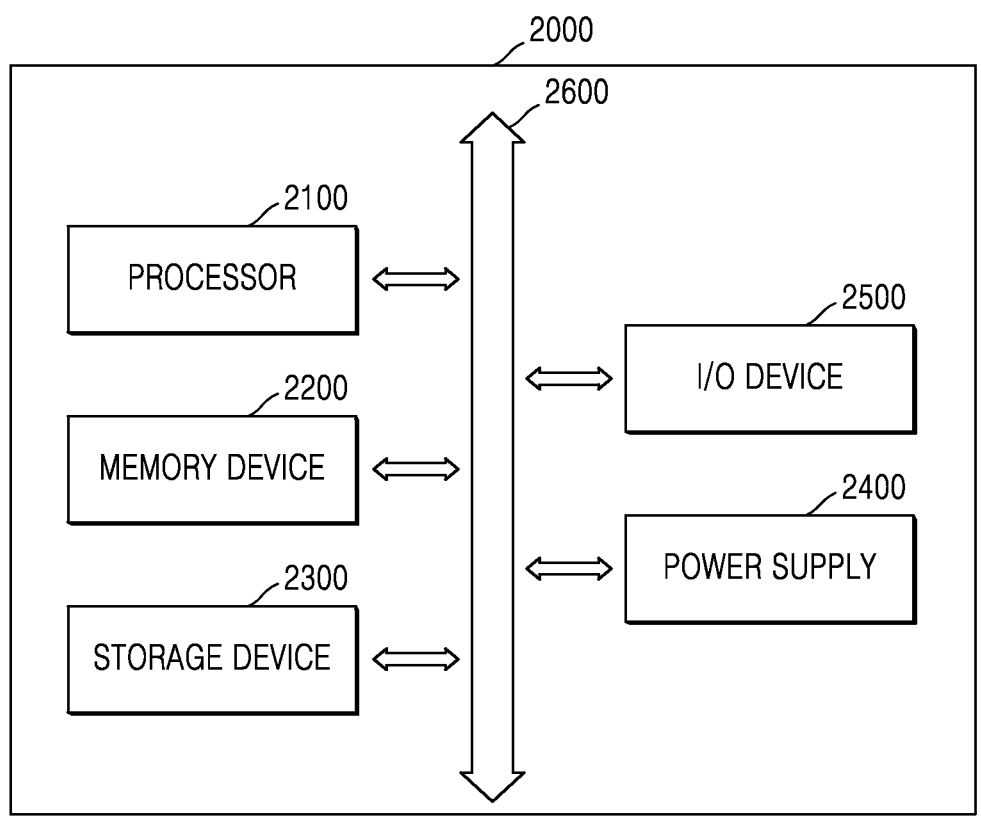
FIG. 16 is a block diagram of a computing system including an IC, according to some example embodiments of the inventive concepts.

FIG. 16 is a block diagram of a computing system including an IC according to some example embodiments of the inventive concepts.

Referring to FIG. 16, a computing system 2000 may include a processor 2100, a memory device 2200, a storage device 2300, a power supply 2400, and an input/output (I/O) device 2500. Although not illustrated in FIG. 16, the computing system 2000 may further include ports capable of communicating with a video card, a sound card, a memory card, a USB device, or the like, or other electronic devices.

The processor 2100, the memory device 2200, the storage device 2300, the power supply 2400, and the I/O device 2500 included in the computing system 2000 may include an IC according to some example embodiments. Specifically, at least one semiconductor device of a plurality of semiconductor devices included in the processor 2100 and the memory device 2200, or a fin transistor included in the semiconductor device may include a plurality of fins extending in a first direction (for example, X direction) and disposed parallel to one another in a second direction (for example, Y direction) perpendicular to the first direction, a first active area disposed adjacent to a first cell boundary line parallel to the plurality of fins and to be spaced apart from the first cell boundary line by a first distance, and a second active area disposed adjacent to a second cell boundary line facing the first cell boundary line and to be spaced apart from the second cell boundary line by a second distance, wherein the first and second distances are constant regardless of the number of fins on the first and second active areas.

The processor 2100 may execute specific calculations or tasks. According to some example embodiments, the processor 2100 may be a micro processor or a central processing unit (CPU). The processor 2100 may communicate with the memory device 2200, the storage device 2300, and the I/O device 2500 through a bus 2600, such as an address bus, a control bus, a data bus, or the like. Depending on some example embodiments, the processor 2100 may be also connected to an expansion bus, such as a peripheral component interconnect (PCI) bus.

The memory device 2200 may store data necessary for operations of the computing system 2000. For example, the memory device 2200 may be implemented by using DRAM, mobile DRAM, PRAM, FRAM, RRAM and/or MRAM. The storage device 2300 may include a solid state drive, a hard disk drive, a CD-ROM, and the like.

The I/O device 2500 may include an input device, such as a keyboard or a keypad, and an output device, such as a printer or display. The power supply 2400 may supply operation voltage for operations of the computing system 2000.

The IC according to the some example embodiments of the inventive concepts may be implemented as various types of packages. For example, at least some configurations of the IC may be mounted by using packages, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), wafer-level processed stack package (WSP), and the like.

The foregoing is illustrative of example embodiments and is not to be construed as limiting thereof. Although a few example embodiments have been described, those skilled in the art will readily appreciate that many modifications are possible in example embodiments without materially departing from the novel teachings. Accordingly, all such modifications are intended to be included within the scope of the disclosure as defined in the claims. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A computer-implemented method of fabricating an integrated circuit (IC), comprising:
    executing on a processor;
    forming at least one standard cell, the forming at least one standard cell including,
        providing a first active area disposed adjacent to a first cell boundary line, and the first active area being spaced apart from the first cell boundary line by a first distance,
        providing a second active area disposed adjacent to a second cell boundary line, the second cell boundary line opposing the first cell boundary line, and the second active area being spaced apart from the second cell boundary line by a second distance, and
        forming fins on the first and second active areas, the fins extending in a first direction and parallel to one another in a second direction substantially perpendicular to the first direction,
        the forming fins including,
            forming at least first active fin on the first active area,
            forming at least one first dummy fin between the first cell boundary line and the first active area, a boundary line of the first active area being between the at least one first dummy fin and the at least one first active fin,
            forming at least one second active fin on the second active area, and
            forming at least one second dummy fin between the second cell boundary line and the second active area, a boundary line of the second active area being between the at least one second dummy fin and the at least one second active fin,
        the first cell boundary line being parallel to the fins, and
        the first distance and the second distance remaining constant when a number of the fins on the first and second active areas is changed;
    generating a layout using the at least one standard cell; and
    fabricating the IC from the generated layout.

2. The method of claim 1, further comprising:
    decreasing a space between the first active area and the second active area when lengths of the first and second active areas in the second direction are increased.

3. The method of claim 1, further comprising:
    adjusting lengths of the first and second active areas in the second direction while the first and second distances remain constant.

4. The method of claim 1, wherein the first distance is substantially equal to the second distance.

5. The method of claim 1, wherein the forming fins further includes
    forming the at least one first and second dummy fins respectively on first and second dummy areas, the first and second active areas not being disposed in the first and second dummy areas.

6. The method of claim 1, wherein the forming fins further includes
    forming at least one third dummy fin between the first active area and second active area.

7. The method of claim 1, wherein a number of the at least one first dummy fin is equal to a number of the at least one second dummy fin.

8. The method of claim 6, further comprising:
    reducing a number of the at least one third dummy fin when a number of the active fins is increased.

9. The method of claim 1, further comprising:
    adjusting a number of the active fins while a number of the at least one first dummy fin and a number of the at least one second dummy fin remain constant.

10. The method of claim 1, wherein the forming at least one standard cell further includes,
    forming conductive lines extending in the second direction, the conductive lines being parallel to one another in the first direction.

11. The method of claim 1, wherein a conductivity type of the first active area is different from a conductivity type of the second active area.

* * * * *